United States Patent
Ueki et al.

(10) Patent No.: US 10,970,610 B2
(45) Date of Patent: Apr. 6, 2021

(54) RFIC MODULE AND RFID TAG

(71) Applicant: Murata Manufacturing Co., Ltd., Nagaokakyo (JP)

(72) Inventors: Noriyuki Ueki, Nagaokakyo (JP); Hirokazu Yazaki, Nagaokakyo (JP); Yoshihiro Aoyama, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/021,376

(22) Filed: Sep. 15, 2020

(65) Prior Publication Data

US 2021/0034939 A1 Feb. 4, 2021

Related U.S. Application Data

(63) Continuation of application No. PCT/JP2020/007461, filed on Feb. 25, 2020.

(30) Foreign Application Priority Data

Jul. 31, 2019 (JP) .............................. JP2019-141047
Nov. 15, 2019 (JP) .............................. JP2019-207024

(51) Int. Cl.
*G06K 19/07* (2006.01)
*H01Q 1/22* (2006.01)

(52) U.S. Cl.
CPC ....... *G06K 19/0723* (2013.01); *H01Q 1/2225* (2013.01)

(58) Field of Classification Search
CPC .......................... G06K 19/0723; H01Q 1/2225
USPC ....................................................... 235/451
See application file for complete search history.

(56) References Cited

U.S. PATENT DOCUMENTS

| | | | |
|---|---|---|---|
| 2007/0076343 A1* | 4/2007 | Terada | H03H 7/425 361/111 |
| 2013/0342301 A1* | 12/2013 | Mano | H01F 27/24 336/200 |
| 2014/0273899 A1 | 9/2014 | Dokai et al. | |
| 2016/0314892 A1* | 10/2016 | Fukushima | H01F 17/0013 |

(Continued)

FOREIGN PATENT DOCUMENTS

| | | |
|---|---|---|
| WO | 2013157288 A1 | 10/2013 |
| WO | 2016084658 A1 | 6/2016 |
| WO | 2018164255 A1 | 9/2018 |

OTHER PUBLICATIONS

International Search Report issued for PCT/JP2020/007461, dated May 19, 2020.

*Primary Examiner* — Michael G Lee
*Assistant Examiner* — David Tardif
(74) *Attorney, Agent, or Firm* — Arent Fox LLP

(57) ABSTRACT

In an impedance matching circuit, first to fourth inductors are formed by a conductor pattern of a coil shape, and a fifth inductor is formed by a conductor pattern of an unwound shape. The first inductor and the third inductor are respectively formed in different layers of a substrate and are arranged in such a relationship as to have coil openings overlapping each other. Moreover, the second inductor and the fourth inductor are respectively formed in different layers of the substrate and are arranged in such a relationship as to have coil openings overlapping each other. Two coils interposing the mounting position of the RFIC are in a 180° rotational symmetry relationship.

20 Claims, 39 Drawing Sheets

(56) References Cited

U.S. PATENT DOCUMENTS

| | | | |
|---|---|---|---|
| 2016/0353619 A1 | 12/2016 | Kato et al. | |
| 2017/0083804 A1 | 3/2017 | Kato et al. | |
| 2017/0133142 A1* | 5/2017 | Park | H03H 1/0007 |
| 2017/0301460 A1* | 10/2017 | Ishida | H01F 27/40 |
| 2017/0367226 A1 | 12/2017 | Kato et al. | |
| 2018/0114104 A1 | 4/2018 | Kato et al. | |
| 2019/0386376 A1 | 12/2019 | Kato | |

* cited by examiner

RFIC MODULE AND RFID TAG

CROSS REFERENCE TO RELATED APPLICATIONS

The present application is a continuation of PCT/JP2020/007461, filed Feb. 25, 2020, which claims priority to Japanese Patent Application No. 2019-141047, filed Jul. 31, 2019, and Japanese Patent Application No. 2019-207024, filed Nov. 15, 2019, the entire contents of each of which are incorporated herein by reference.

TECHNICAL FIELD

The present invention relates to a Radio Frequency Integrated Circuit (RFIC) module and a Radio Frequency IDentifier (RFID) tag including the same.

BACKGROUND

In general, WO 2016/084658 A discloses an RFIC module that is coupled to a conductor to serve as an antenna. The RFIC module includes a substrate, an RFIC chip mounted on the substrate, and a matching circuit formed by a plurality of coils connected to the RFIC chip.

An effort to thin/downsize the RFIC module having the structure described in WO 2016/084658 A may result in two of the plurality of coils forming the matching circuit being extremely close to each other. The coils thus arranged close to each other may cause unwanted radiation and/or coupling depending on their winding directions and/or shapes. When a plurality of RFIC modules are arranged close to each other, the unwanted radiation and/or unwanted coupling occurs between the coils of the RFIC modules arranged close to each other. As a result, the RFIC module and the RFID tag become more susceptible to disturbance to have their characteristics degraded.

SUMMARY OF THE INVENTION

Thus, an object of the present invention is to provide an RFIC module and an RFID tag featuring the suppression of the influence of unwanted radiation from coils of a matching circuit and/or the influence of unwanted coupling between a plurality of coils forming the matching circuit.

Accordingly, an RFIC module is provided that includes a substrate, an RFIC mounted on or in the substrate, an RFIC side first terminal electrode and an RFIC side second terminal electrode to which the RFIC is connected. Moreover, an antenna side first terminal electrode and an antenna side second terminal electrode are formed on or in the substrate and are each directly connected or capacitively coupled to an antenna, and an impedance matching circuit is formed on or in the substrate and connected to the RFIC side first terminal electrode, the RFIC side second terminal electrode, the antenna side first terminal electrode, and the antenna side second terminal electrode. The impedance matching circuit includes a first inductor, a second inductor, a third inductor, a fourth inductor, and a fifth inductor. The first inductor is connected between the antenna side first terminal electrode and the RFIC side first terminal electrode. The second inductor is connected between the antenna side second terminal electrode and the RFIC side second terminal electrode. The third inductor has a first end connected to the antenna side first terminal electrode. The fourth inductor has a first end connected to the antenna side second terminal electrode. The fifth inductor is connected between a second end of the third inductor and a second end of the fourth inductor. The first inductor, the second inductor, the third inductor, and the fourth inductor are formed by a conductor pattern of a coil shape wound along a surface of the substrate. The fifth inductor is formed by a conductor pattern of an unwound shape. The first inductor and the third inductor are respectively formed in different layers of the substrate and are arranged in such a relationship as to have coil openings overlapping each other. Moreover, the second inductor and the fourth inductor, and the first inductor and the third inductor are arranged in such a positional relationship as to interpose a mounting position of the RFIC along the surface of the substrate.

Furthermore, an RFID tag according an exemplary embodiment includes an antenna and an RFIC module connected or coupled to the antenna, and the structure of this RFIC module is as described above.

With the exemplary embodiments of the present invention, an RFIC module and an RFID tag including the same featuring the suppression of the influence of unwanted radiation from coils of a matching circuit and/or the influence of unwanted coupling between a plurality of coils forming the matching circuit can be obtained.

DETAILED DESCRIPTION

First Embodiment

Figure 1A:
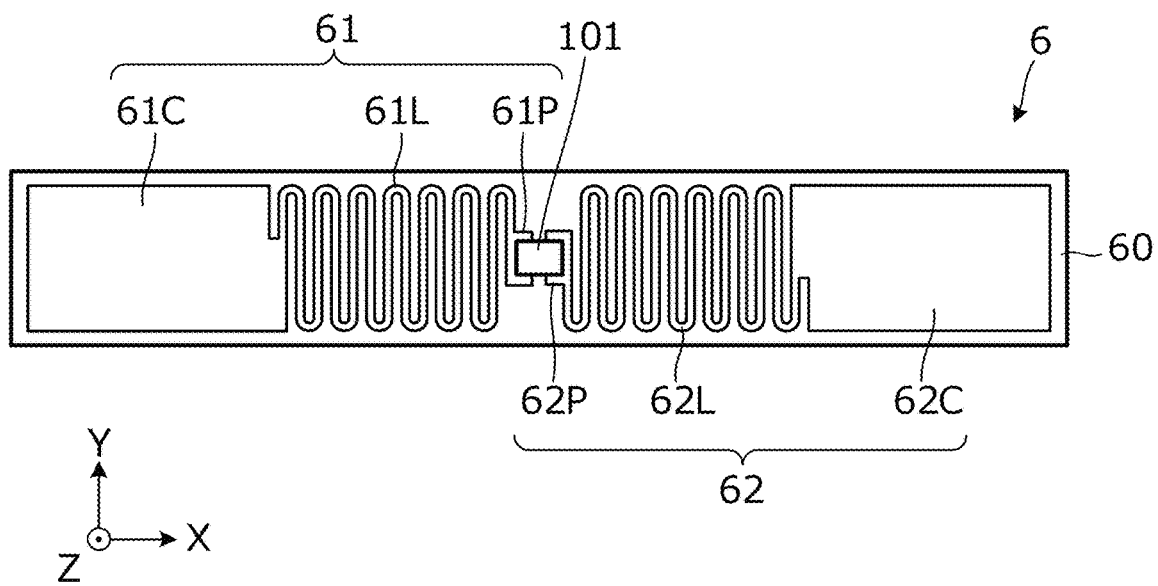
FIG. 1A is a plan view of an RFID tag 201 according to a first embodiment.
Figure 1B:
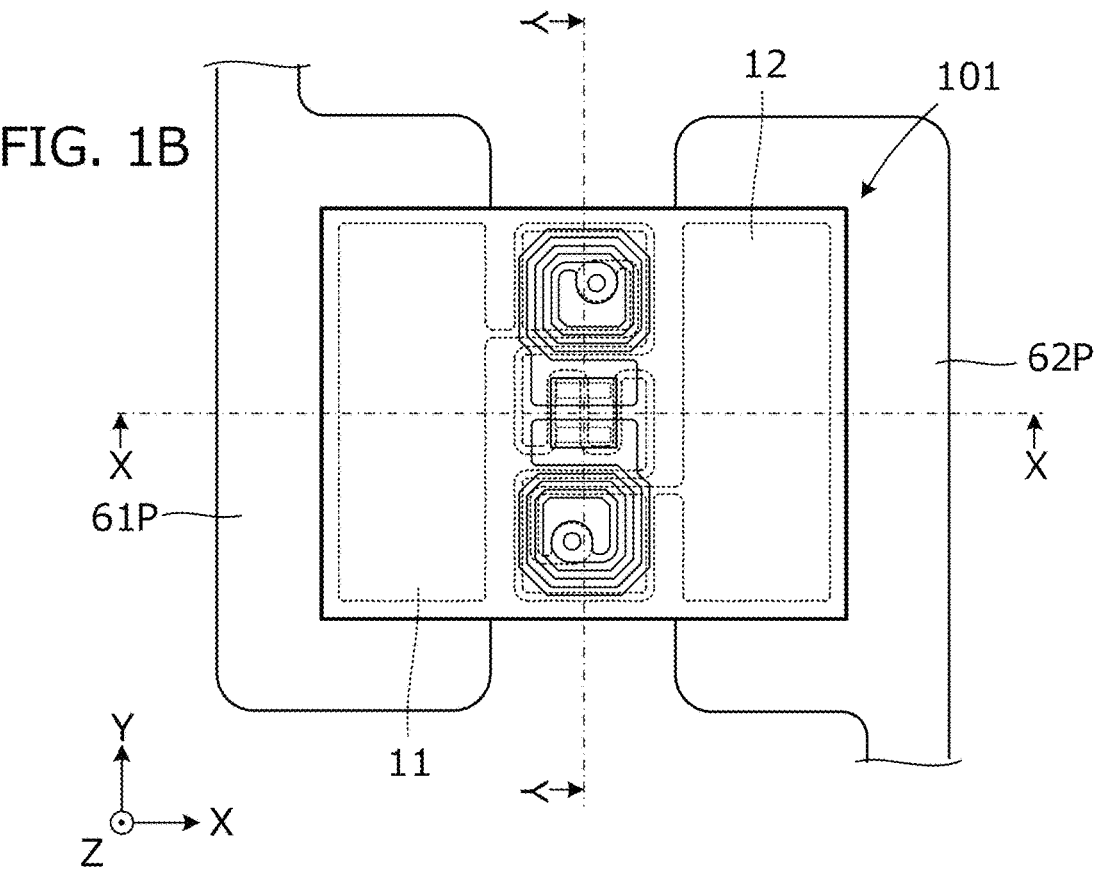
FIG. 1B is an enlarged plan view of a mounting portion for an RFIC module 101 in the RFID tag 201, on an insulating film 60.

FIG. 1A is a plan view of an RFID tag 201 according to a first embodiment. FIG. 1B is an enlarged plan view of a mounting portion for an RFIC module 101 in the RFID tag 201.

As shown, the RFID tag 201 includes an antenna 6 and the RFIC module 101 coupled to the antenna 6. The antenna 6 includes an insulating film 60 and conductor patterns 61 and 62 formed on the insulating film 60. In an exemplary aspect, the insulating film 60 is, for example, a polyethylene terephthalate (PET) film, and the conductor patterns 61 and 62 are, for example, aluminum foil patterns.

The conductor pattern 61 includes conductor patterns 61P, 61L, and 61C, and the conductor pattern 62 includes conductor patterns 62P, 62L, and 62C. The conductor patterns 61 and 62 are configured to form a dipole antenna.

The RFIC module 101 is mounted on the conductor patterns 61P and 62P. The conductor patterns 61L and 62L have a meander line shape and serve as a high inductance component region. Moreover, the conductor patterns 61C and 62C have a planar shape and serve as a high capacitance component region. With this configuration, the formation region where the conductor patterns 61 and 62 of the antenna are formed is downsized, with an inductance component in a high current intensity region increased and with a capacitance component in a high voltage intensity region increased.

Figure 2:
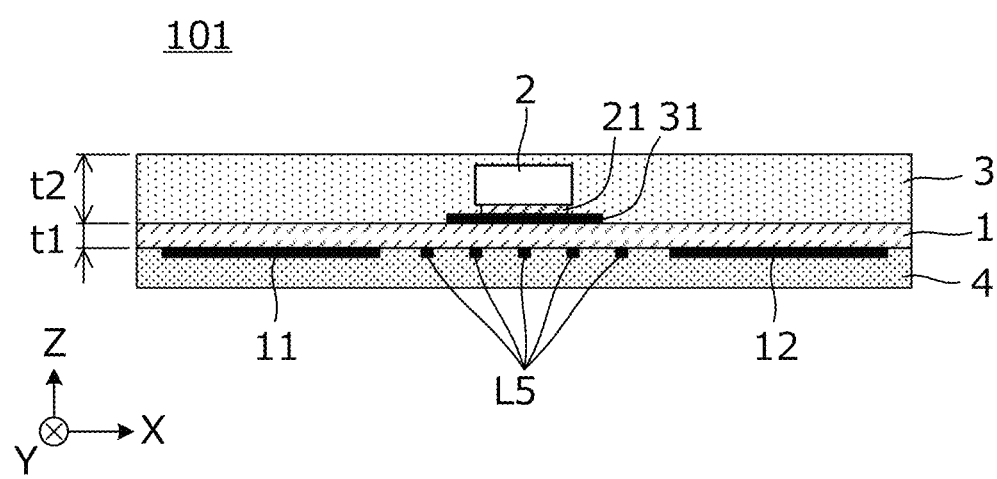
FIG. 2 is a cross-sectional view of RFIC module 101.

FIG. 2 is a cross-sectional view of the RFIC module 101. The RFIC module 101 includes a substrate 1 and an RFIC 2 mounted on the substrate 1. The substrate 1 is, for example, a flexible substrate including polyimide or the like. The upper surface of the substrate 1, on which the RFIC 2 is mounted, is covered with a protective film 3 as further shown. The protective film 3 can include a hot melt agent such as elastomer such as polyurethane and ethylene vinyl acetate (EVA), for example. The substrate 1 has a lower surface provided with a coverlay film 4. The coverlay film 4 is, for example, a polyimide film. Thus, all of the substrate 1, the protective film 3, and the coverlay film 4 are flexible, meaning the RFIC module 101 as a whole is flexible.

The protective film 3 may include a thermosetting resin. In this case, warpage of the RFIC module 101 during manufacturing or use can be reduced, with a thickness t2 of the protective film 3 set to be larger than a thickness t1 of the substrate 1. Specifically, a difference in thermal contraction between materials forming the layers of a stack generally leads to distortion resulting in warpage of the stack, whereas the thickness t2 of the protective film 3 set to be larger than the thickness t1 of the substrate 1 results in the thickness of the protective film 3 being dominant. Thus, influence of a difference in the thermal contraction of other layers relative to the protective film 3 is reduced, whereby the warpage is suppressed.

Figure 3:
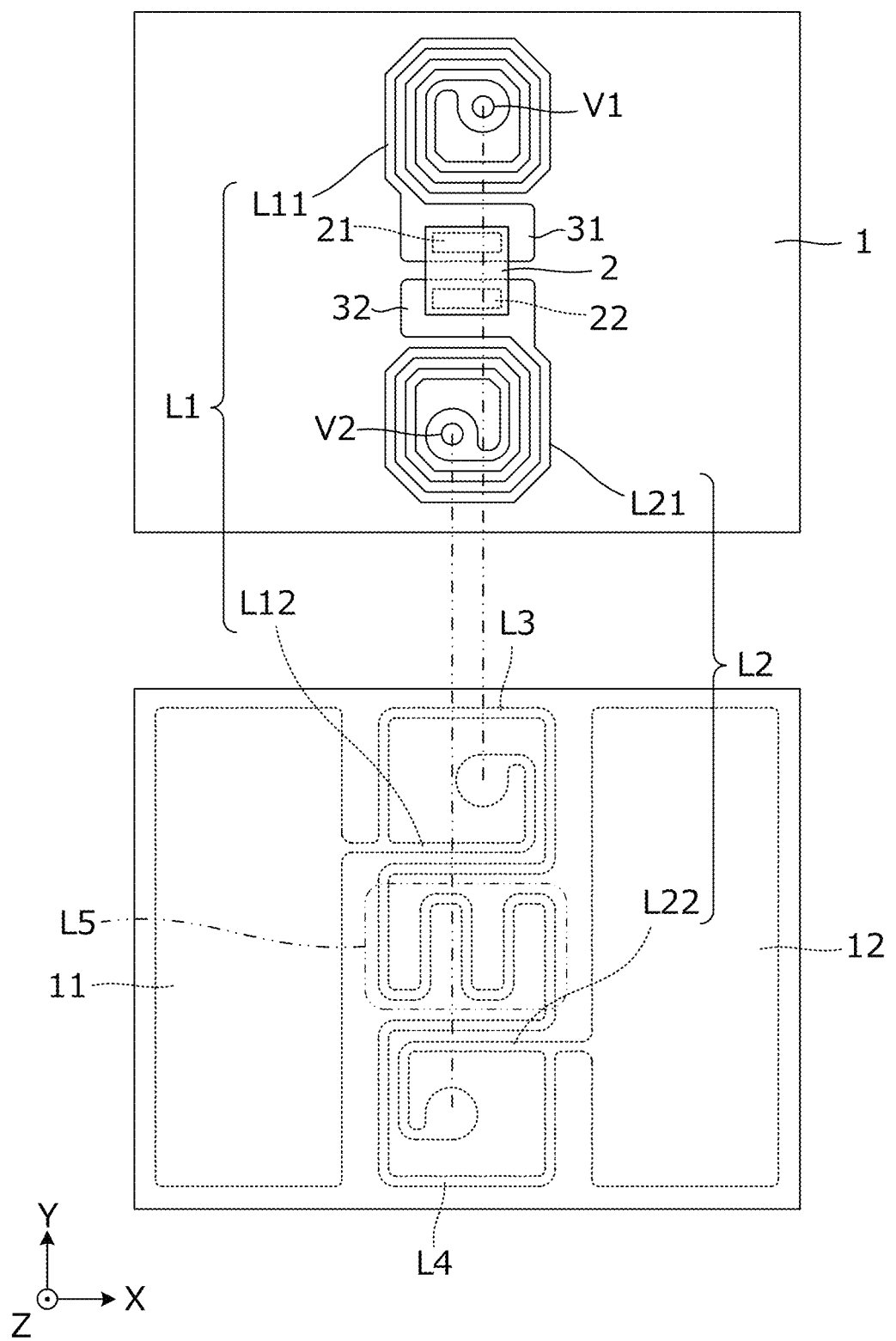
FIG. 3 is a plan view of conductor patterns formed on a substrate 1 of the RFIC module 101.

FIG. 3 is a plan view of conductor patterns formed on the substrate 1 of the RFIC module 101. It is noted that an upper part of FIG. 3 is a plan view of conductor patterns formed on the upper surface of the substrate 1, and a lower part of FIG. 3 is a plan view of conductor patterns formed on the lower surface of the substrate 1.

As shown, the upper surface of the substrate 1 is provided with an RFIC side first terminal electrode 31, an RFIC side second terminal electrode 32, a conductor pattern L11 that is a main part of a first inductor L1, and a conductor pattern L21 that is a main part of a second inductor L2. The RFIC side first terminal electrode 31 is connected to a first end of the conductor pattern L11, and the RFIC side second terminal electrode 32 is connected to a first end of the conductor pattern L21. These conductor patterns are, for example, obtained by patterning copper foil by photolithography.

The lower surface of the substrate 1 is provided with an antenna side first terminal electrode 11 and an antenna side second terminal electrode 12 that are capacitively coupled to the conductor patterns 61P and 62P of the antenna 6. The lower surface of the substrate 1 is further provided with a conductor pattern L12 that is a part of the first inductor L1, a conductor pattern L22 that is a part of the second inductor, a conductor pattern of a third inductor L3, a conductor pattern of a fourth inductor L4, and a conductor pattern of a fifth inductor L5 (conductor pattern surrounded by a two-dotted chain line). These conductor patterns are, for example, also obtained by patterning copper foil by photolithography.

A first end of the conductor pattern L12 that is a part of the first inductor L1 and a first end of the conductor pattern of the third inductor L3 are connected to the antenna side first terminal electrode 11. Similarly, a first end of the conductor pattern L22 that is a part of the second inductor L2 and a first end of the conductor pattern of the fourth inductor L4 are connected to the antenna side second terminal electrode 12. The conductor pattern of the fifth inductor L5 is connected between a second end of the conductor pattern of the third inductor L3 and a second end of the conductor pattern of the fourth inductor L4.

As further shown by the dashed lines, a second end of the conductor pattern L12 of the first inductor L1 and a second end of the conductor pattern L11 of the main part of the first inductor L1 are connected to each other via a via conductor V1. Similarly, a second end of the conductor pattern L22 of the second inductor L2 and a second end of the conductor pattern L21 of the main part of the second inductor L2 are connected to each other via a via conductor V2.

The RFIC 2 is mounted on the RFIC side first terminal electrode 31 and the RFIC side second terminal electrode 32. That is, a terminal 21 and a terminal 22 of the RFIC 2 are respectively connected to the RFIC side first terminal electrode 31 and the RFIC side second terminal electrode 32.

The first inductor L1 and the third inductor L3 are respectively formed in different layers of the substrate 1, and are arranged in such a relationship as to have coil openings overlapping each other. Similarly, the second inductor L2 and the fourth inductor L4 are respectively formed in different layers of the substrate 1, and are arranged in such a relationship as to have coil openings overlapping each other. The second inductor L2 and the fourth inductor L4, and the first inductor L1 and the third inductor L3 are arranged in such a positional relationship as to interpose the mounting position of the RFIC 2 along the surface of the substrate 1.

Furthermore, the winding direction from the RFIC side first terminal electrode 31 to a second end of the third inductor L3 is the same as the winding direction from the RFIC side second terminal electrode 32 to a second end of the fourth inductor L4. In FIG. 3, they are both in the clockwise direction. Thus, a set of the first inductor L1 and the third inductor L3 and a set of the second inductor L2 and the fourth inductor L4 can be regarded as being in a 180° rotational symmetry relationship while interposing the mounting position of the RFIC 2.

Figure 4:
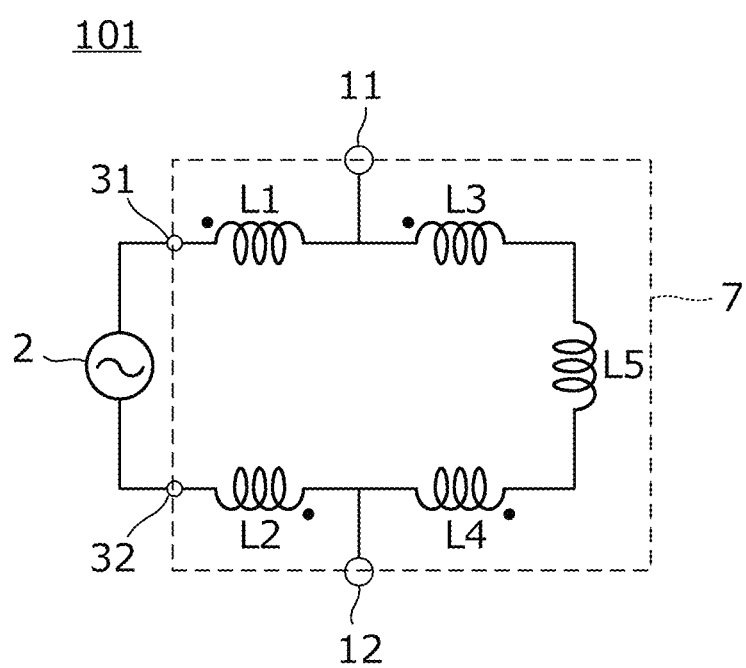
FIG. 4 is a circuit diagram of the RFIC module 101.

FIG. 4 is a circuit diagram of the RFIC module 101. The RFIC module 101 includes the RFIC 2 and an impedance matching circuit 7. The impedance matching circuit 7 is connected to the RFIC side first terminal electrode 31, the RFIC side second terminal electrode 32, the antenna side first terminal electrode 11, and the antenna side second terminal electrode 12. As further shown, the impedance matching circuit 7 includes the first inductor L1, the second inductor L2, the third inductor L3, the fourth inductor L4, and the fifth inductor L5.

The first inductor L1 includes the conductor patterns L11 and L12 illustrated in FIG. 3, and the second inductor L2 includes the conductor patterns L21 and L22 illustrated in FIG. 3. The first inductor L1 is connected between the antenna side first terminal electrode 11 and the RFIC side first terminal electrode 31. The second inductor L2 is connected between the antenna side second terminal electrode 12 and the RFIC side second terminal electrode 32. A first end of the third inductor L3 is connected to the antenna side first terminal electrode 11, a first end of the fourth inductor L4 is connected to the antenna side second terminal electrode 12, and the fifth inductor L5 is connected between the second end of the third inductor L3 and the second end of the fourth inductor L4.

Figure 5A:
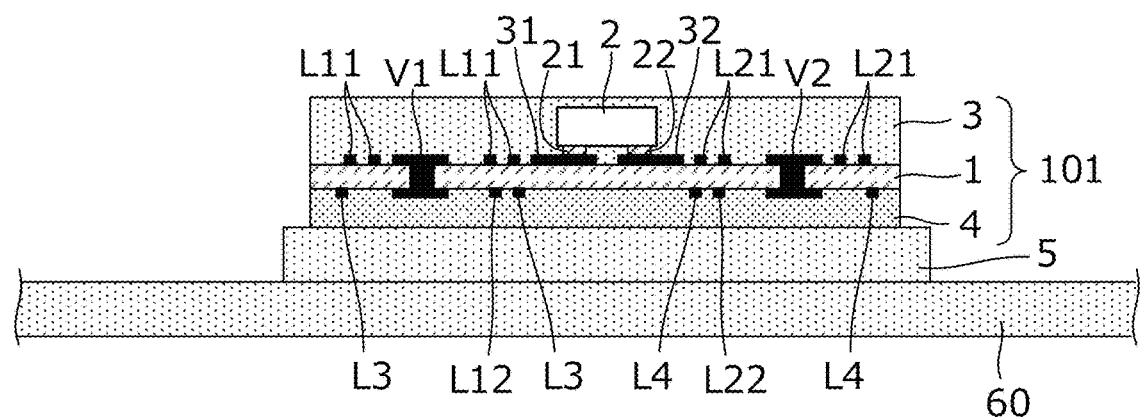
FIG. 5A is a cross-sectional view taken along line Y-Y in FIG. 1B.
Figure 5B:
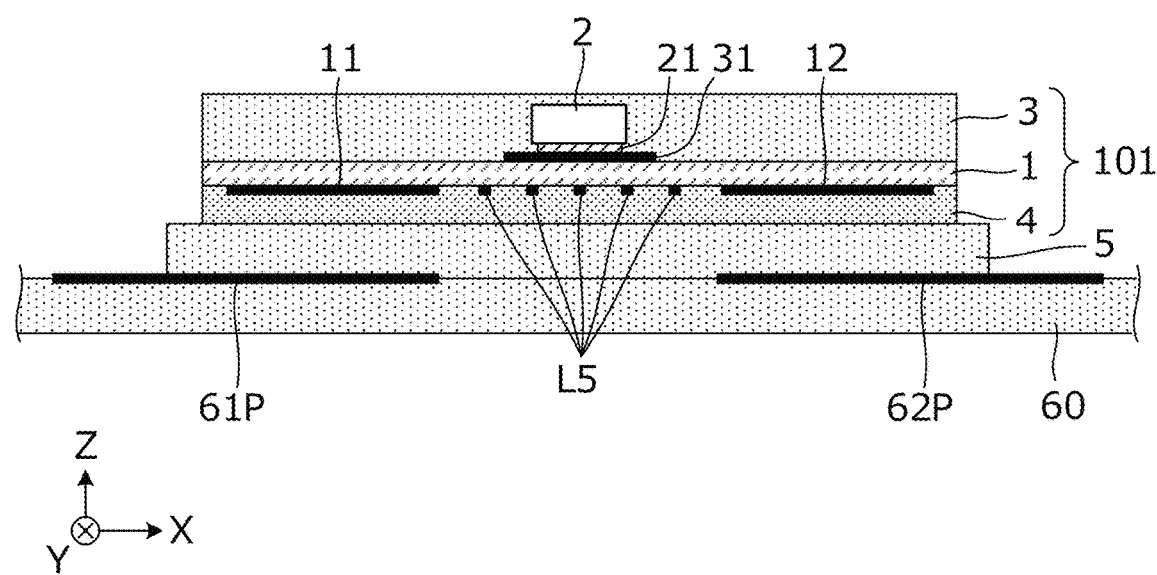
FIG. 5B is a cross-sectional view taken along line X-X in FIG. 1B.

Now, a cross-sectional structure of the mounting position of the RFIC module 101 with respect to the antenna 6 in the RFID tag 201 will be described. FIG. 5A is a cross-sectional view taken along line Y-Y in FIG. 1B, and FIG. 5B is a cross-sectional view taken along line X-X in FIG. 1B. As illustrated in FIGS. 5A and 5B, the RFIC module 101 is bonded to the insulating film 60 of the antenna 6 via an adhesive layer 5. According to an exemplary aspect, the adhesive layer 5 is a layer of an insulating adhesive material an example of which includes an acrylic adhesive agent. The antenna side first terminal electrode 11 faces the conductor pattern 61P of the antenna 6 with the adhesive layer 5 provided in between, and the antenna side second terminal electrode 12 faces the conductor pattern 62P of the antenna 6 with the adhesive layer 5 provided in between. With this structure, the antenna side first terminal electrode 11 and the antenna side second terminal electrode 12 are respectively capacitively coupled to the conductor patterns 61P and 62P of the antenna 6.

The longitudinal direction of the region where the conductor patterns of the inductors L1, L2, L3, L4, and L5 are formed and the longitudinal direction of the region where the conductor patterns 61 and 62 of the antenna 6 are formed are in an orthogonal relationship. Advantageously, a minimum possible space is required for mounting the RFIC module 101 according to this configuration, whereby the RFID tag can be downsized.

Next, advantageous effects of the RFIC module and the RFID tag of the present embodiment will be described one by one.

Figure 6:
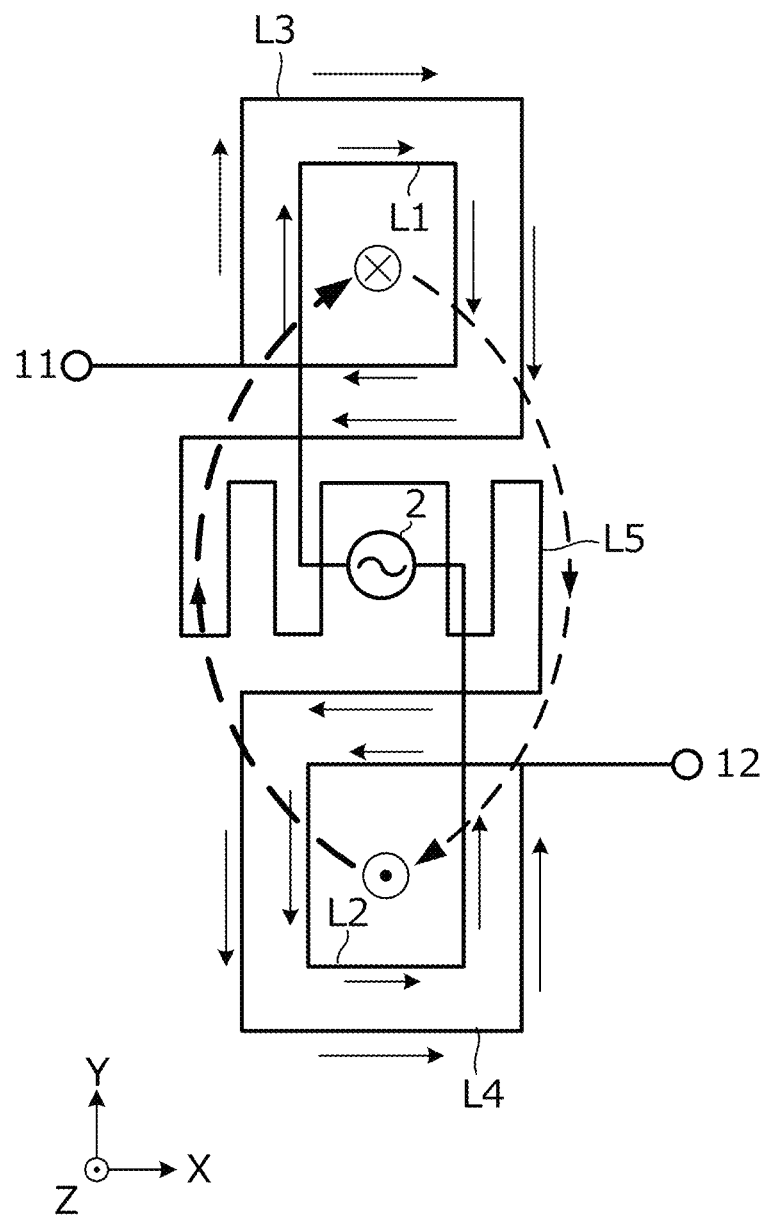
FIG. 6 is a diagram illustrating a relationship between current and magnetic flux for each inductor of an impedance matching circuit.
Figure 7:
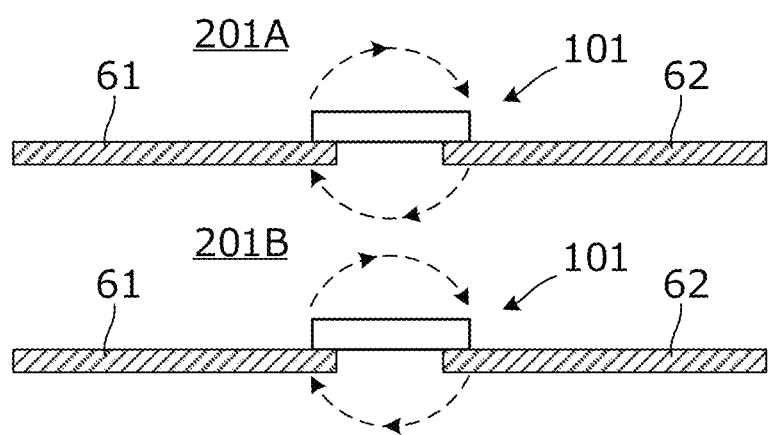
FIG. 7 is a diagram illustrating how a closed magnetic circuit is formed by inductor forming coils of the impedance matching circuit.

FIGS. 6 and 7 are diagrams illustrating how a closed magnetic circuit is formed by the inductor forming coils of the impedance matching circuit 7.

FIG. 6 is a diagram illustrating a relationship between current and magnetic flux for each inductor of the impedance matching circuit 7. In FIG. 6, the solid arrows indicate the directions of current that flows when the RFIC 2 transmits. The broken lines indicate the magnetic flux passing through coil openings. With the current in the direction as illustrated in FIG. 6, a magnetic flux is generated to pass through the coil openings of the second inductor L2 and the fourth inductor L4 and pass through the coil openings of the first inductor L1 and the third inductor L3.

Thus, a closed magnetic circuit is formed by the magnetic flux, substantially along the Y-Z plane, generated through the coil forming the first inductor L1, the coil forming the second inductor L2, the coil forming the third inductor L3, and the coil forming the fourth inductor L4. Specifically, the magnetic fluxes generated between the coil openings of the second inductor L2 and the fourth inductor L4 and the coil openings of the first inductor L1 and the third inductor L3 (i.e., between the coil openings close to each other) are in a closed relationship, whereby magnetic flux leakage is reduced, so that the influence of disturbance can be reduced. Furthermore, the coils close to each other are positively coupled, so that the magnetic fluxes strengthen each other, whereby and Q values of the inductors L1, L2, L3, and L4 are improved.

FIG. 7 is a diagram illustrating an advantage of forming the closed magnetic circuit when two RFID tags 201A and 201B are arranged close to each other. In FIG. 7, the structure of the RFIC module 101 and the shapes of the conductor patterns 61 and 62 of the antenna are simply illustrated. In FIG. 7, the broken lines represent the magnetic fluxes in the closed magnetic circuit.

An example of a situation where the RFID tags are closed to each other includes a case where the RFID tags provided on a plurality of documents or books overlap each other. RFID tags communicate by reflecting radio waves transmitted from a reader/writer. However, conventional RFID tags fail to perform appropriate communications in the situation described above, because another RFID tag largely absorbs the energy of the radio waves. Another factor disabling the appropriate communications include deviation of impedance from a specified value as viewed from the RFIC of one RFID tag due to another RFID tag being closely provided.

On the other hand, with the RFID tag of the present embodiment, unwanted magnetic field coupling between the RFIC modules 101 of the RFID tags 201A and 201B is suppressed, whereby deterioration of the RFID tag characteristics of each RFID tag can be suppressed.

Figure 8:
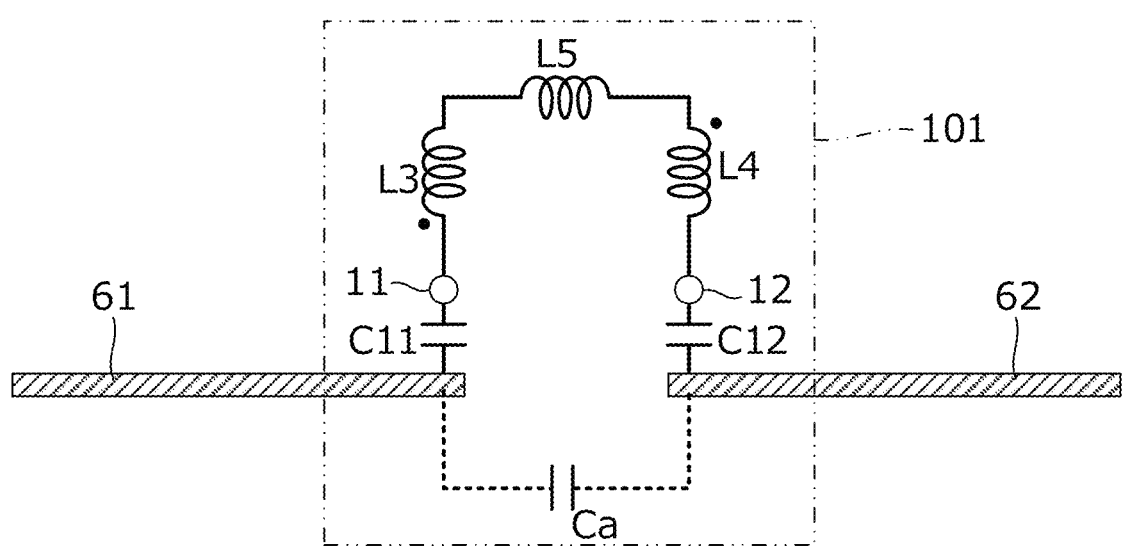
FIG. 8 is a diagram illustrating a connection relationship between inductors L3, L4, and L5 and conductor patterns 61 and 62 of an antenna.
Figure 9:
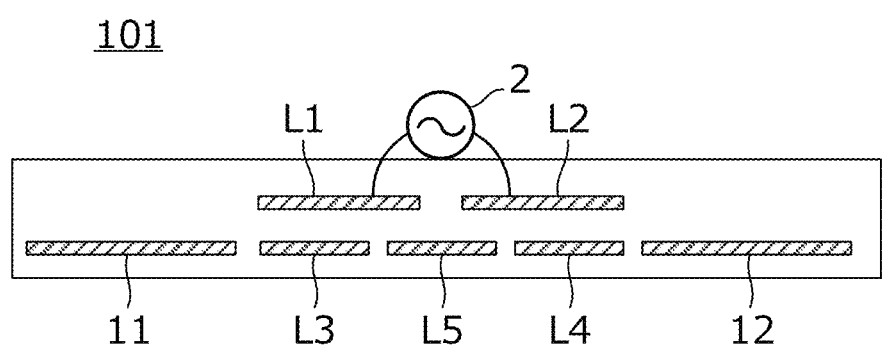
FIG. 9 is a diagram illustrating the stability of the characteristics of the RFIC module 101 against displacement of the conductor patterns.

FIGS. 8 and 9 are diagrams illustrating the stability of the characteristics of the RFIC module 101 against the displacement of the conductor patterns.

FIG. 8 is a diagram illustrating a connection relationship between the third inductor L3, the fourth inductor L4, and the conductor patterns 61 and 62 of the antenna. A capacitor Ca in FIG. 8 is a capacitive component generated between the conductor patterns 61 and 62 of the antenna. A capacitor C11 is a capacitive component generated between the conductor pattern 61 of the antenna and the antenna side first terminal electrode 11, and a capacitor C12 is a capacitive component generated between the conductor pattern 62 of the antenna and the antenna side second terminal electrode 12. A parallel resonance circuit is configured by the inductance of the inductors L3 and L4 and the capacitance of the capacitors Ca, C11, and C12. The resonance frequency of this resonance circuit is set to match the center frequency of the communication frequency band of the RFID tag 201, for example.

FIG. 9 is a schematic cross-sectional view illustrating the positional relationship between the inductors L1, L2, L3, L4, and L5, the antenna side first terminal electrode 11, and the antenna side second terminal electrode 12 in the RFIC module 101. As illustrated in FIGS. 3 and 5A, the main parts of the first inductor L1 and the second inductor L2 are formed on the upper surface of the substrate 1, and the third inductor L3, the fourth inductor L4, and the fifth inductor L5 are formed on the lower surface of the substrate 1. The antenna side first terminal electrode 11 and the antenna side second terminal electrode 12 are formed together with the third inductor L3, the fourth inductor L4, and the fifth inductor L5.

When the inductors L3, L4, and L5 are formed in a layer different from a layer in which the antenna side first terminal electrode 11 and the antenna side second terminal electrode 12 are formed, a part of the inductors L3, L4, and L5 may overlap the antenna side first terminal electrode 11 or the antenna side second terminal electrode 12, as a result of displacement of their conductor patterns. When this overlapping occurs, the inductance of the inductors L3, L4, and L5 decreases. On the other hand and as shown in FIG. 9, when the inductors L3, L4, and L5 are in the same layer as the antenna side first terminal electrode 11 and the antenna side second terminal electrode 12 as in the present embodiment, the part of the inductors L3, L4, and L5 do not overlap the antenna side first terminal electrode 11 or the antenna side second terminal electrode 12 due to displacement of their conductor patterns. Thus, the resonance frequency described above does not shift due to the deterioration of the inductance of the inductors L3, L4, and L5. As a result, stable communication characteristics can be achieved.

Figure 10:
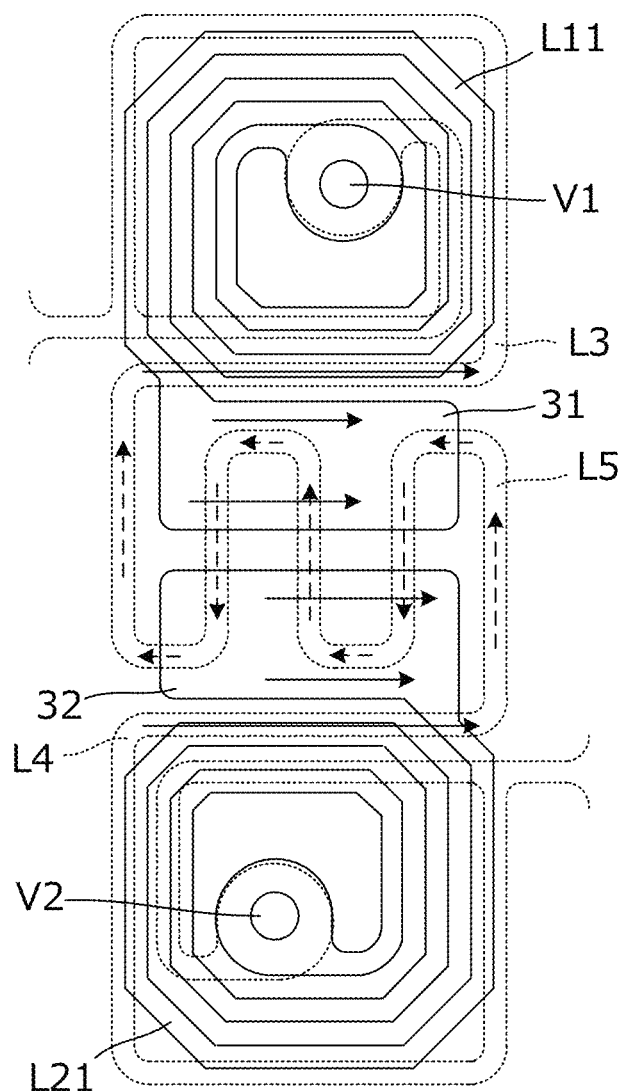
FIG. 10 is a diagram illustrating how unwanted coupling between the inductors L1, L2, L3, and L4 and the inductor L5 is suppressed.

FIG. 10 is a diagram illustrating how unwanted coupling between the inductors L1, L2, L3, and L4 and the inductor L5 is suppressed.

In FIG. 10, the solid arrows in the X direction indicate a current flowing in a portion close to the inductor L5, of the current flowing in the inductors L1, L2, L3, and L4, the RFIC side first terminal electrode 31, and the RFIC side second terminal electrode 32. The arrows in the Y direction indicate a current, of the current flowing in the inductor L5, flowing orthogonal to the current in the X direction. Furthermore, current in the X direction, of the current flowing in the inductor L5, is a current that is coupled with the current flowing in the inductors L1, L2, L3, and L4, the RFIC side first terminal electrode 31, and the RFIC side second terminal electrode 32, and flows in an opposite direction. Thus, the coupling results in a reduction in the inductance values of the inductors L1, L2, L3, L4, and L5. Still, the inductor L5 of the present embodiment has a meander line shape, meaning that the amount of the coupling can be reduced by setting an electrode portion involving orthogonal current to be long, when an area where the conductor patterns are formed is increased to obtain a desired inductance value. As a result, a decrease in the inductance values of the inductors L1, L2, L3, L4, and L5 can be suppressed.

In the example illustrated in FIG. 10, a winding region of the conductor pattern L11 that is the main part of the first inductor is slightly smaller than a winding region of the conductor pattern of the third inductor L3. The conductor pattern L11 that is the main part of the first inductor and the conductor pattern of the third inductor L3 overlap each other by an area corresponding to approximately half of the line widths of these conductor patterns. Furthermore, when a relative shift occurs between the conductor pattern L11 that is the main part of the first inductor and the conductor pattern of the third inductor L3 to result in a reduction in the overlapping amount between the conductor pattern L11 that is the main part of the first inductor and the conductor pattern of the third inductor L3 on one side in the direction of the shift, the overlapping amount between the conductor pattern L11 that is the main part of the first inductor and the conductor pattern of the third inductor L3 increases on the other side.

Similarly, a winding region of the conductor pattern L21 that is the main part of the second inductor is slightly smaller than a winding region of the conductor pattern of the fourth inductor L4. The conductor pattern L21 that is the main part of the second inductor and the conductor pattern of the fourth inductor L4 overlap each other by an area corresponding to approximately half of the line widths of these conductor patterns. Furthermore, when a relative shift occurs between the conductor pattern L21 that is the main part of the second inductor and the conductor pattern of the fourth inductor L4 to result in a reduction in the overlapping amount between the conductor pattern L21 that is the main part of the second inductor and the conductor pattern of the fourth inductor L4 on one side in the direction of the shift, the overlapping amount between the conductor pattern L21 that is the main part of the second inductor and the conductor pattern of the fourth inductor L4 increases on the other side.

With the structure described above, the fluctuation of the magnetic field coupling amount between the conductor patterns in different layers due to the above "shift" can be suppressed, whereby the fluctuation of the inductance values of the inductors L1, L2, L3, and L4 can be suppressed.

The size relationship between the winding region of the conductor pattern L11 that is the main part of the first inductor and the winding region of the conductor pattern of the third inductor L3 may be reversed. Still, the formation region where the conductor pattern L11 that is the main part of the first inductor and the conductor pattern L21 that is the main part of the second inductor are formed, which is in a layer different from the antenna side first terminal electrode 11 and the antenna side second terminal electrode 12, is preferably made smaller to prevent the formation region from overlapping the antenna side first terminal electrode 11 and the antenna side second terminal electrode 12.

Second Embodiment

In a second embodiment, an example of an RFIC module different from the first embodiment in the configurations of the substrate 1 and the protective film 3 will be described.

Figure 11A:
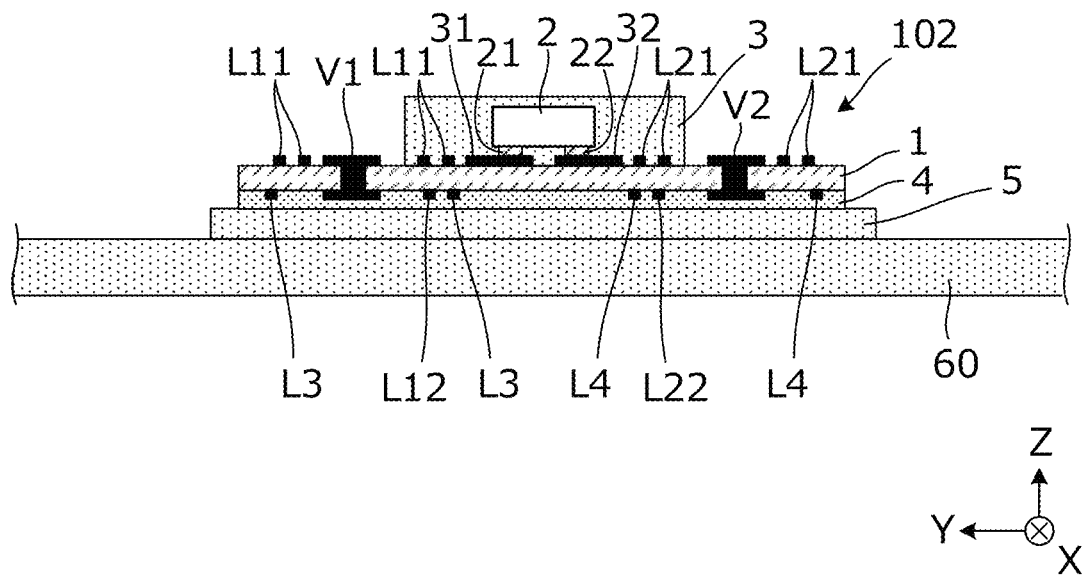
FIGS. 11A and 11B are cross-sectional views of an RFIC module 102 according to a second embodiment, which is attached to the insulating film 60.
Figure 11B:
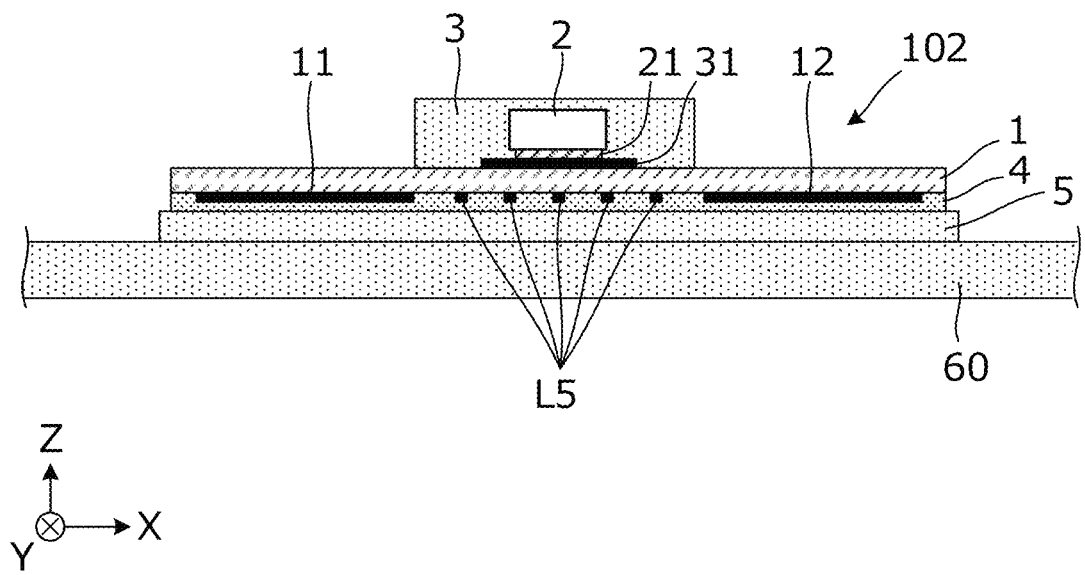

FIGS. 11A and 11B are cross-sectional views of an RFIC module 102 according to the second embodiment, which is attached to the insulating film 60. FIG. 11A is a cross-sectional view taken along line Y-Y in FIG. 1B in the first embodiment, and FIG. 11B is a cross-sectional view taken along line X-X in FIG. 1B.

The configuration of the protective film 3 of the RFIC module 102 of the second embodiment is different from the example described in the first embodiment. In the second embodiment, the protective film 3 is formed in a part of the substrate 1 to cover the RFIC 2, instead of entirely covering the substrate 1 according to the first embodiment.

Figure 12A:
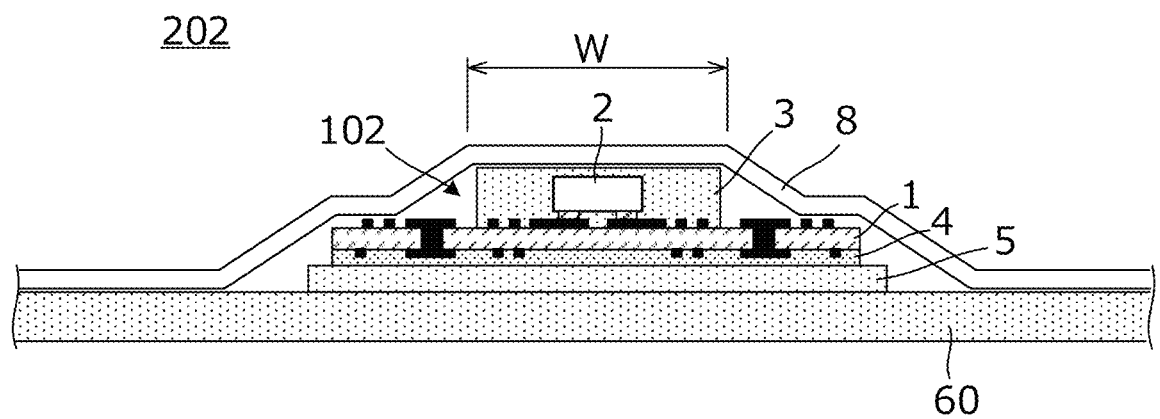
FIG. 12A is a cross-sectional view illustrating a state in which a label 8 is attached over the insulating film 60 and the RFIC module 102.
Figure 12B:
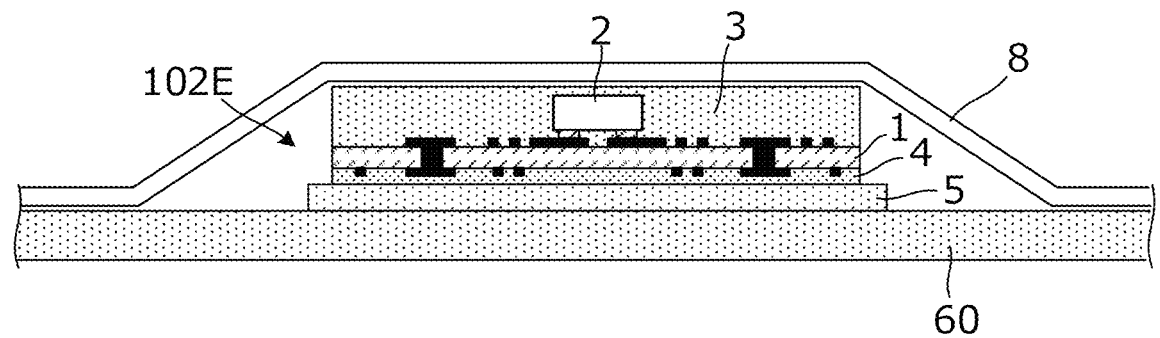
FIG. 12B is a cross-sectional view serving as a comparative example.

FIG. 12A is a cross-sectional view illustrating a state in which a label 8 is attached over the insulating film 60 and the RFIC module 102. FIG. 12B is a cross-sectional view illustrating a state in which a label 8 is attached over the insulating film 60 and an RFIC module 102E serving as a comparative example. An adhesive layer is formed on the inner surface of the label 8. The label 8 covers the upper portions of the insulating film 60 and the RFIC module 102, while being attached via the adhesive layer. On the outer surface of the label 8 thus being in the attached state, predetermined characters, marks, pictures, or the like are printed by ribbon thermal transferring. An adhesive layer is also formed on the lower surface of the insulating film 60, and an RFID tag 202 is attached to an article via this adhesive layer.

In the RFIC module 102E serving as the comparative example illustrated in FIG. 12B, the protective film 3 is formed entirely over the substrate 1 as described above in the first embodiment. Thus, the label 8 in the attached state has a large unevenness corresponding to the thickness of the RFIC module 102E. Since printability is low in the uneven portion with a large step, clear printing may fail to be performed on the label 8.

On the other hand, in the RFID tag 202 of the present embodiment illustrated in FIG. 12A, the label 8 only has unevenness smaller than the entire thickness of the RFIC module 102. Furthermore, a width W of the highest part from the insulating film 60 is smaller than the width of the RFIC module 102. Thus, clear printing on the label 8 is possible compared with FIG. 12B.

The impedance matching circuit obtained by the conductor patterns formed on the substrate 1 of the RFIC module 102 is not limited to the circuit described above.

Third Embodiment

A third embodiment is an example where the configuration of the substrate 1 and the mounting structure of the RFIC 2 are different from those in the examples described above.

Figure 13:
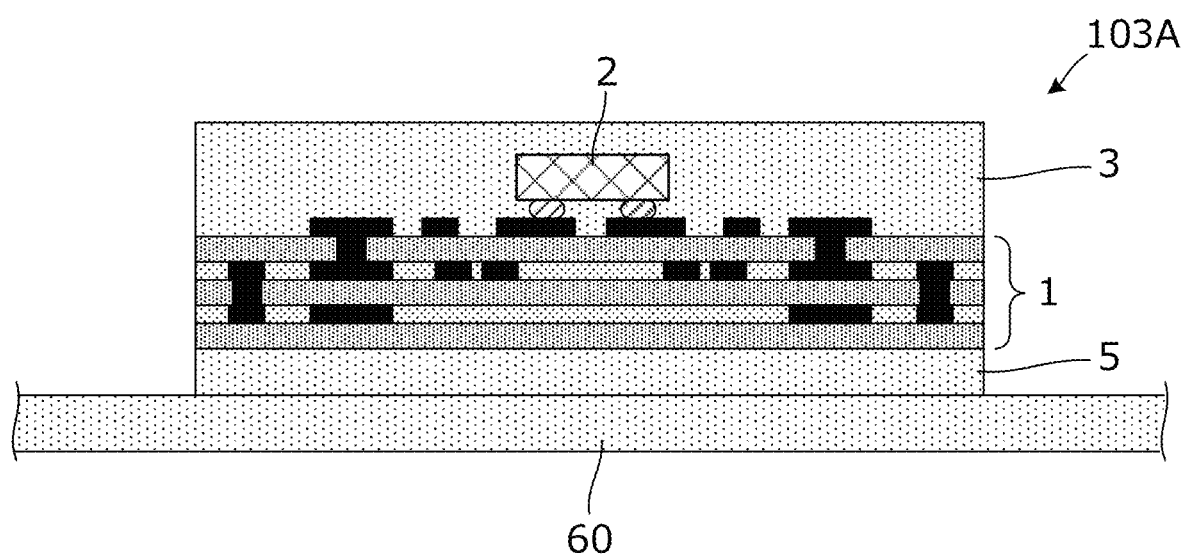
FIG. 13 is a cross-sectional view illustrating a state where an RFIC module 103A according to a third embodiment is attached to the insulating film 60.

FIG. 13 is a cross-sectional view illustrating a state where an RFIC module 103A according to the third embodiment is attached to the insulating film 60. In this example, the substrate 1 is configured as a multilayer substrate, and conductor patterns are formed on a plurality of base material layers. With the multilayer substrate thus used, the coverlay film 4 as in the example illustrated in FIGS. 5A and 5B is not required. The coverlay film is usually thin and has low adhesive strength, and thus is peeled and burred depending on the processing condition, when a physical splitting process such as blade dicing is performed. The present embodiment is free of such phenomenon because the coverlay film is not required.

Figure 14:
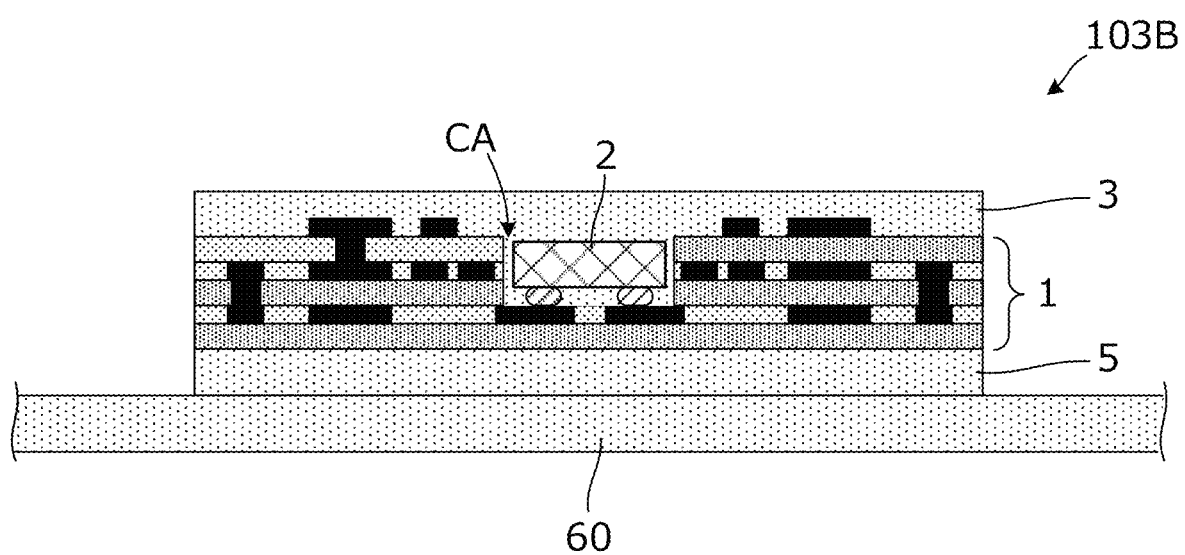
FIG. 14 is a cross-sectional view illustrating a state where another RFIC module 103B according to the third embodiment is attached to the insulating film 60.

FIG. 14 is a cross-sectional view illustrating a state where another RFIC module 103B according to the third embodiment is attached to the insulating film 60. In this example, a cavity CA is formed in the substrate 1 that is a multilayer substrate, and the RFIC 2 is embedded in the cavity CA. With the RFIC 2 thus embedded in the substrate 1, the height can be reduced.

Chip components other than the RFIC 2 may be embedded in the substrate 1. For example, a harvesting chip capacitor of a relatively large size, various sensors, and the like may be embedded.

The impedance matching circuit obtained by the conductor patterns formed on or in the substrate 1 of the RFIC modules 103A and 103B is not limited to the circuit described above.

Fourth Embodiment

A fourth embodiment relates to an example of an RFIC module with the positions and the shapes of the antenna side first terminal electrode 11 and the antenna side second terminal electrode 12 being different from those in the examples described above.

Figure 15:
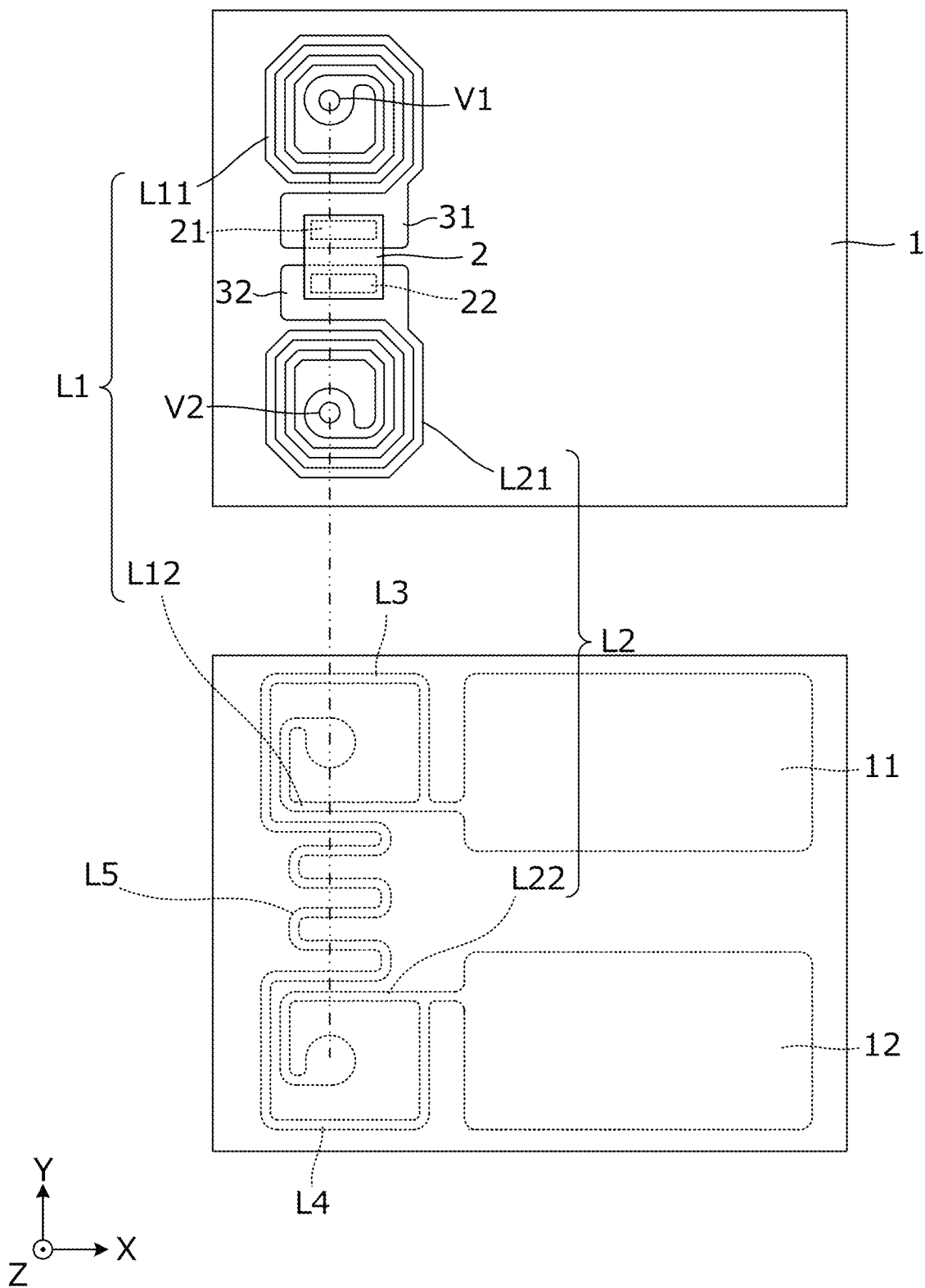
FIG. 15 is a plan view of conductor patterns formed on the substrate 1 of an RFIC module according to a fourth embodiment.

FIG. 15 is a plan view of conductor patterns formed on the substrate 1 of the RFIC module according to the fourth embodiment.

The upper surface of the substrate 1 is provided with an RFIC side first terminal electrode 31, an RFIC side second terminal electrode 32, a conductor pattern L11 that is a main part of a first inductor L1, and a conductor pattern L21 that is a main part of a second inductor L2. The RFIC side first terminal electrode 31 is connected to a first end of the conductor pattern L11, and the RFIC side second terminal electrode 32 is connected to a first end of the conductor pattern L21.

The lower surface of the substrate 1 is provided with an antenna side first terminal electrode 11 and an antenna side second terminal electrode 12 that are capacitively coupled to the conductor patterns 61P and 62P of the antenna 6. The lower surface of the substrate 1 is further provided with a conductor pattern L12 that is a part of the first inductor L1, a conductor pattern L22 that is a part of the second inductor, a conductor pattern of a third inductor L3, a conductor pattern of a fourth inductor L4, and a conductor pattern of a fifth inductor L5.

A first end of the conductor pattern L12 that is a part of the first inductor L1 and a first end of the conductor pattern of the third inductor L3 are connected to the antenna side first terminal electrode 11. Similarly, a first end of the conductor pattern L22 that is a part of the second inductor L2 and a first end of the conductor pattern of the fourth inductor L4 are connected to the antenna side second terminal electrode 12. The conductor pattern of the fifth inductor L5 is connected between a second end of the conductor pattern of the third inductor L3 and a second end of the conductor pattern of the fourth inductor L4.

A second end of the conductor pattern L12 of the first inductor L1 and a second end of the conductor pattern L11 of the main part of the first inductor L1 are connected to each other via a via conductor V1. Similarly, a second end of the conductor pattern L22 of the second inductor L2 and a second end of the conductor pattern L21 of the main part of the second inductor L2 are connected to each other via a via conductor V2.

As shown, the difference from the example illustrated in FIG. 3 in the first embodiment is in a drawing direction of the antenna side first terminal electrode 11 and the antenna side second terminal electrode 12, with respect to the first inductor L1 and the second inductor L2. Specifically, in the fourth embodiment, the antenna side first terminal electrode 11 and the antenna side second terminal electrode 12 are routed in the same direction with respect to the first inductor L1 and the second inductor L2. Furthermore, the winding direction of the conductor pattern from the RFIC side first terminal electrode 31 of the first inductor L1 to the antenna side first terminal electrode 11 is opposite to the winding direction of the conductor pattern from the RFIC side second terminal electrode 32 of the second inductor L2 to the antenna side second terminal electrode 12.

Figure 16:
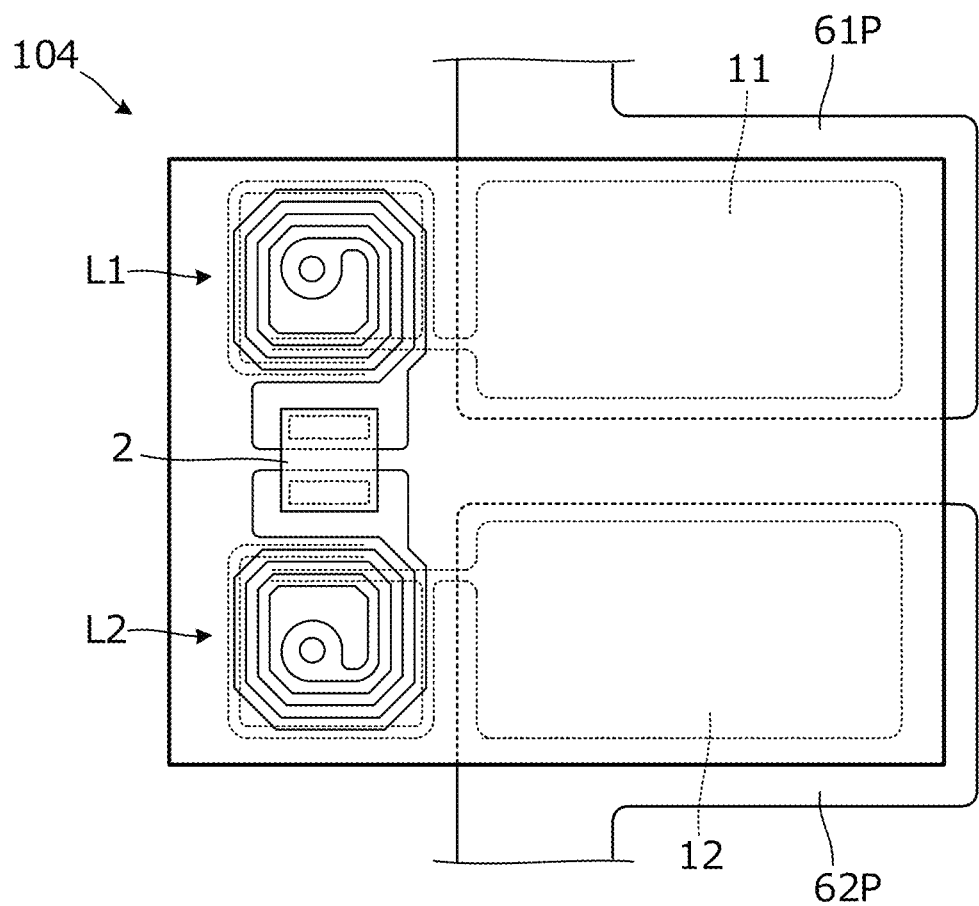
FIG. 16 is an enlarged plan view of a mounting portion for an RFIC module 104 according to the fourth embodiment, on the insulating film.

FIG. 16 is an enlarged plan view of a mounting portion for the RFIC module 104 according to the fourth embodiment, on the insulating film. FIG. 16 does not illustrate the outline of the insulating film. The insulating film is provided with conductor patterns 61P and 62P that are end portions of a dipole antenna. The antenna side first terminal electrode 11 and the antenna side second terminal electrode 12 of the RFIC module 104 respectively face the conductor pattern 61P and the conductor pattern 62P.

With the present embodiment, since the arrangement interval of the conductor patterns 61P and 62P of the antenna can be made small, the inter-terminal capacity between the conductor patterns 61P and 62P increases, whereby the resonance frequency of the antenna can be shifted toward the low frequency side. Thus, the length (formation region) of the antenna in the arrangement direction of the conductor patterns 61P, 62P at a desired frequency can be made short.

The impedance matching circuit obtained by the conductor patterns formed on the substrate 1 of the RFIC module 104 is not limited to the circuit described above.

Fifth Embodiment

A fifth embodiment relates to an example of an RFIC module with the positions and the shapes of the first inductor L1, the second inductor L2, the antenna side first terminal electrode 11, and the antenna side second terminal electrode 12 being different from those in the examples described above.

Figure 17:
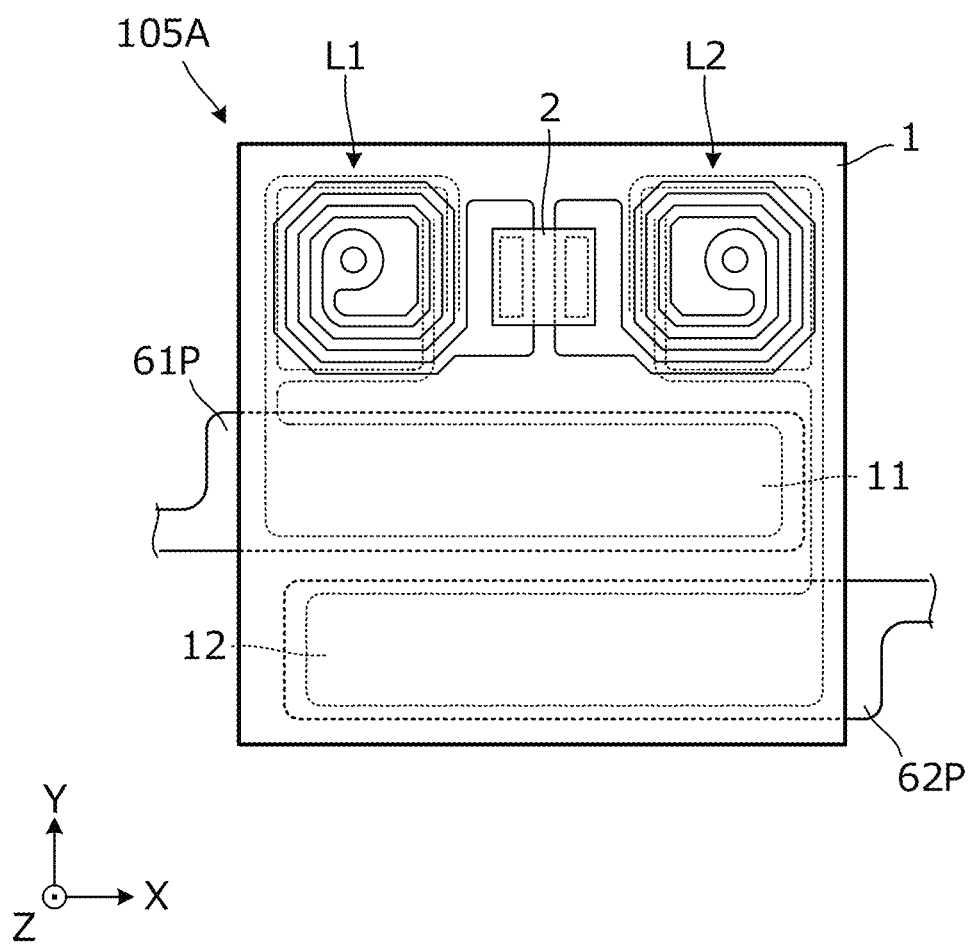
FIG. 17 is an enlarged plan view of a mounting portion for an RFIC module 105A according to a fifth embodiment, on the insulating film.
Figure 18:
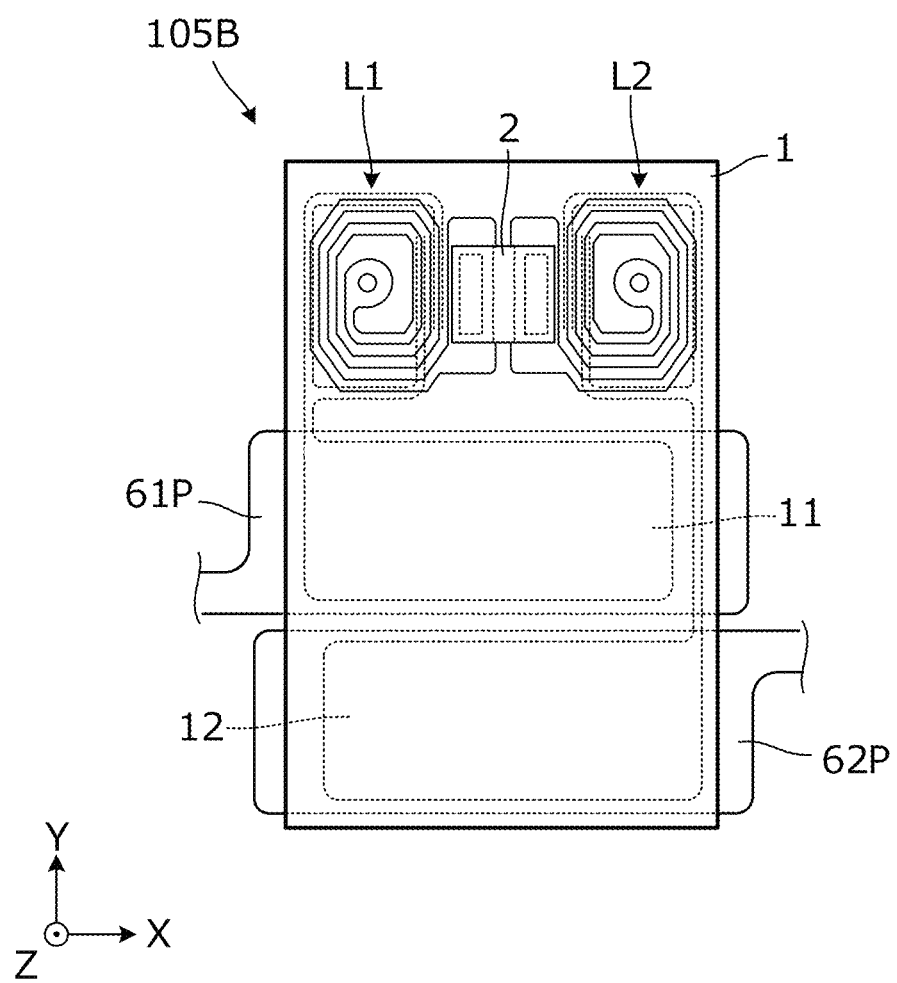
FIG. 18 is an enlarged plan view of a mounting portion for another RFIC module 105B according to the fifth embodiment, on the insulating film.
Figure 19:
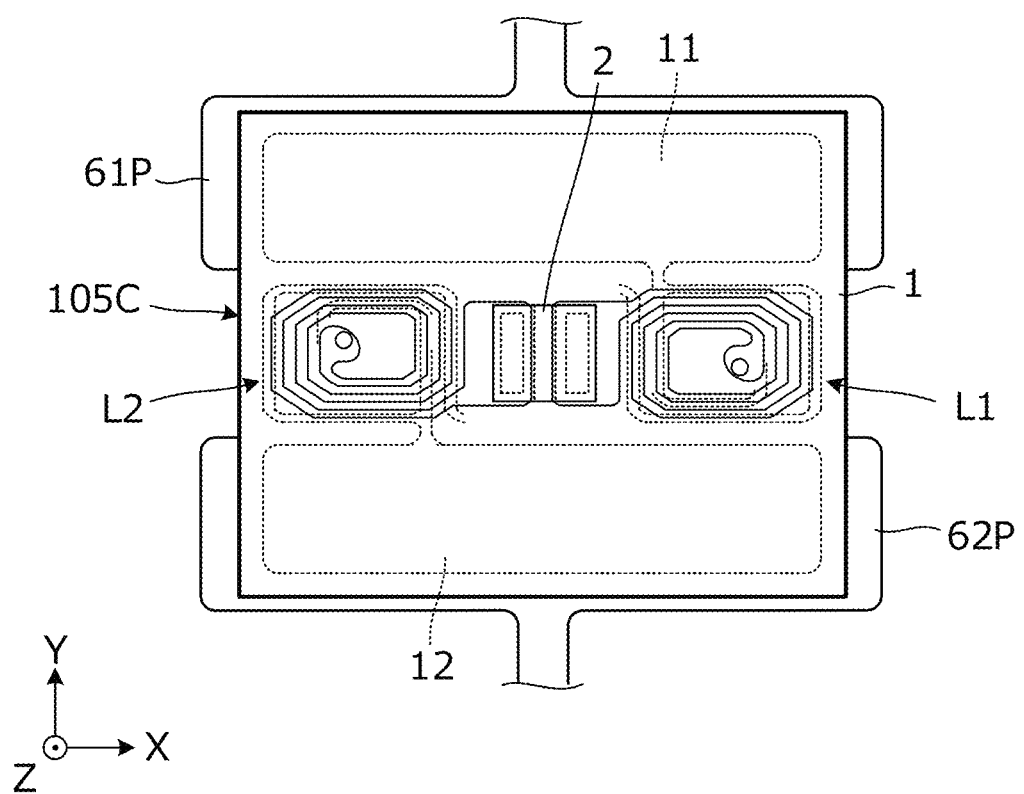
FIG. 19 is an enlarged plan view of a mounting portion for still another RFIC module 105C according to the fifth embodiment, on the insulating film.

FIGS. 17, 18, and 19 are enlarged plan views respectively illustrating mounting portions of RFIC modules 105A, 105B, and 105C according to the fifth embodiment, on the insulating film. These figures do not illustrate the outline of the insulating film. The impedance matching circuit has a basic configuration that is similar to those in the example described above. In any of the examples, the antenna side first terminal electrode 11 and the antenna side second terminal electrode 12 are arranged in parallel with the arrangement direction of the first inductor L1 and the second inductor L2.

The RFIC module 105A illustrated in FIG. 17 facilitates an increase in the capacity generated between the conductor patterns 61P and 62P of the antenna 6, and the antenna side first terminal electrode 11 and the antenna side second terminal electrode 12, so that the length (e.g., formation region) of the antenna in the X direction can be made short.

The aspect ratio of the substrate 1 is different between the RFIC module 105A illustrated in FIG. 17 and the RFIC module 105B illustrated in FIG. 18. When the width in the arrangement direction of the first inductor L1 and the second inductor L2 is limited, the substrate 1 may be designed to be long in the arrangement direction of the antenna side first terminal electrode 11 and the antenna side second terminal electrode 12, as in the RFIC module 105B illustrated in FIG. 18. Furthermore, the conductor patterns of the first inductor L1 and the second inductor L2 may be flattened in the arrangement direction (X direction) thereof.

In the RFIC module 105C illustrated in FIG. 19, the antenna side first terminal electrode 11 and the antenna side second terminal electrode 12 are arranged to interpose the first inductor L1 and the second inductor L2. As in this RFIC module 105C, when the width in the arrangement direction of the antenna side first terminal electrode 11 and the antenna side second terminal electrode 12 is limited, the first inductor L1 and the second inductor L2 may be flattened in a direction (Y direction) orthogonal to the arrangement direction thereof.

The impedance matching circuit obtained by the conductor patterns formed on the substrate 1 of the RFIC modules 105A, 105B, and 105C is not limited to the circuit described above.

Sixth Embodiment

A sixth embodiment relates to an example of an RFIC module with the positions and the shapes of the antenna side first terminal electrode 11 and the antenna side second terminal electrode 12 being different from those in the examples described above.

Figure 20A:
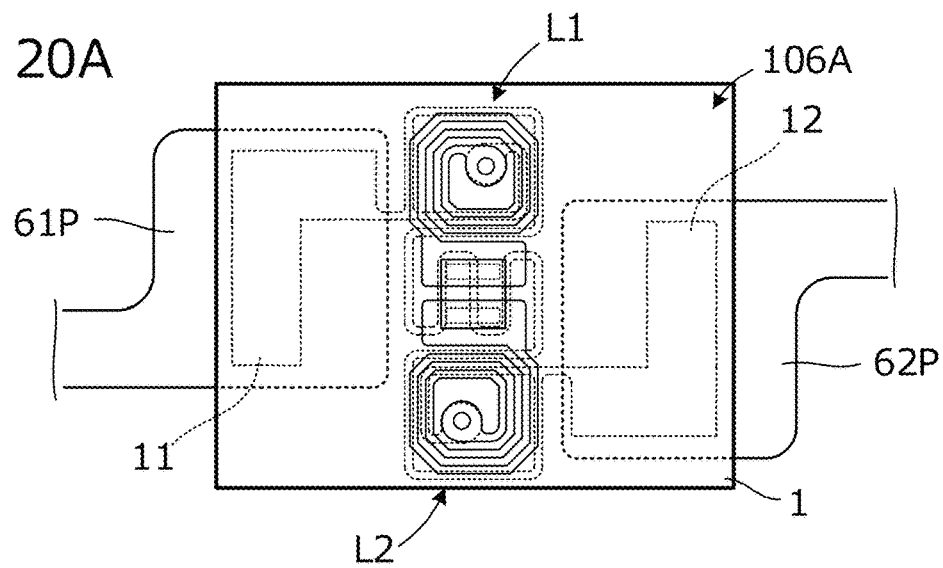
FIG. 20A is an enlarged plan view of a mounting portion for an RFIC module 106A according to a sixth embodiment, on the insulating film.
Figure 20B:
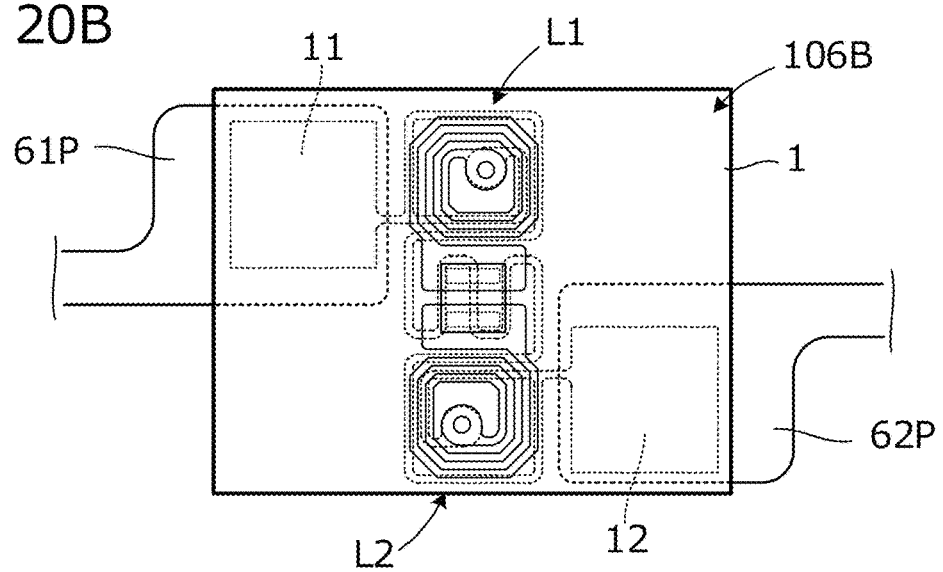
FIG. 20B is an enlarged plan view of a mounting portion for another RFIC module 106B according to the sixth embodiment, on the insulating film.
Figure 20C:
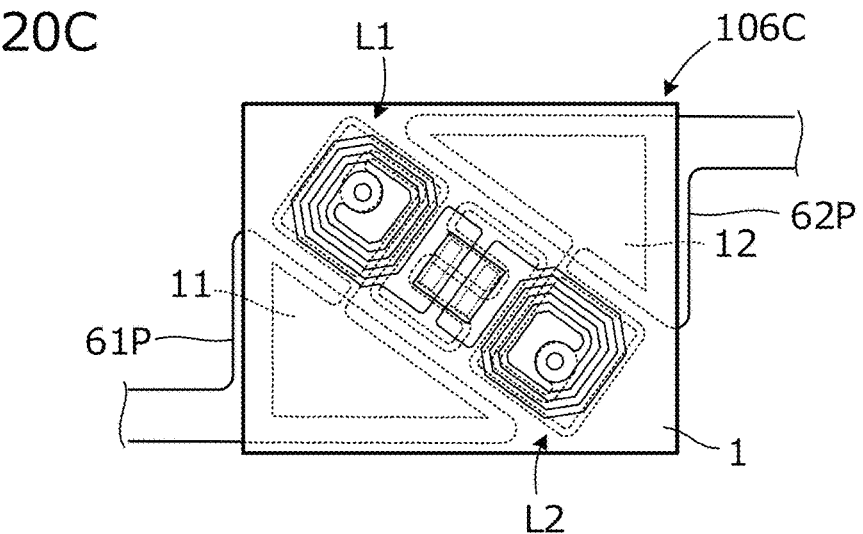
FIG. 20C is an enlarged plan view of a mounting portion for still another RFIC module 106C according to the sixth embodiment, on the insulating film.

FIGS. 20A, 20B, and 20C are enlarged plan views respectively illustrating mounting portions of RFIC modules 106A, 106B, and 106C according to the sixth embodiment, on the insulating film. These figures do not illustrate the outline of the insulating film. The impedance matching circuit has a basic configuration that is similar to those in the example described above.

In the RFIC module 106A illustrated in FIG. 20A, the antenna side first terminal electrode 11 and the antenna side second terminal electrode 12 have an L-shape instead of a simple rectangular shape.

In the RFIC module 106B illustrated in FIG. 20B, the antenna side first terminal electrode 11 and the antenna side second terminal electrode 12 each have a square shape.

In the RFIC modules 106A and 106B, the antenna side first terminal electrode 11 and the antenna side second terminal electrode 12 are arranged on the diagonal line of the substrate 1 (e.g., in opposing corner of the substrate 1).

In the RFIC module 106C illustrated in FIG. 20C, the antenna side first terminal electrode 11 and the antenna side second terminal electrode 12 each have a triangular shape and are arranged on the diagonal line of the substrate 1. Furthermore, the arrangement direction of the first inductor L1 and the second inductor L2 is inclined with respect to sides of the substrate 1.

As described in the present embodiment, the antenna side first terminal electrode 11 and the antenna side second terminal electrode 12 may be arranged on the diagonal line of the substrate 1. Furthermore, the positions of the first inductor L1 and the second inductor L2 may also be on the diagonal line of the substrate 1.

According to the present embodiment, unwanted parasitic capacitance generated between the antenna side first terminal electrode 11 and the antenna side second terminal electrode 12 can be reduced. With the parasitic capacitance thus made small, the variations of the resonance frequency and the gain of the antenna due to an influence of the dielectric constant, loss, or the like of the attachment target, for example, can be reduced.

The impedance matching circuit obtained by the conductor patterns formed on the substrate 1 of the RFIC modules 106A, 106B, and 106C is not limited to the circuit described above.

Seventh Embodiment

A seventh embodiment relates to an example of an RFIC module with the number of the antenna side first terminal electrodes 11 and the antenna side second terminal electrodes 12 being different from those in the examples described above.

Figure 21:
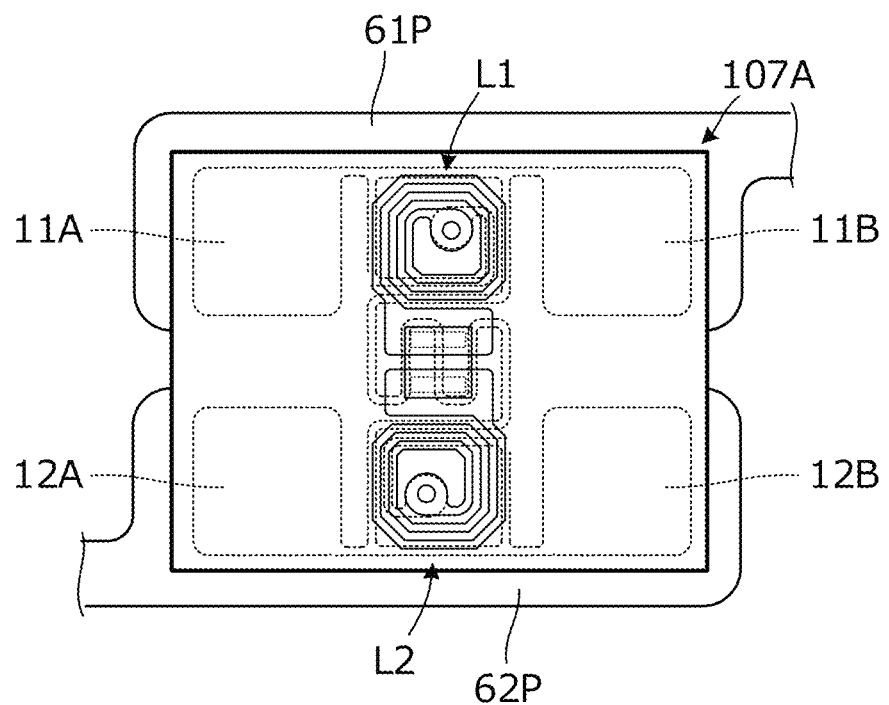
FIG. 21 is an enlarged plan view of a mounting portion for an RFIC module 107A according to a seventh embodiment, on the insulating film.
Figure 22:
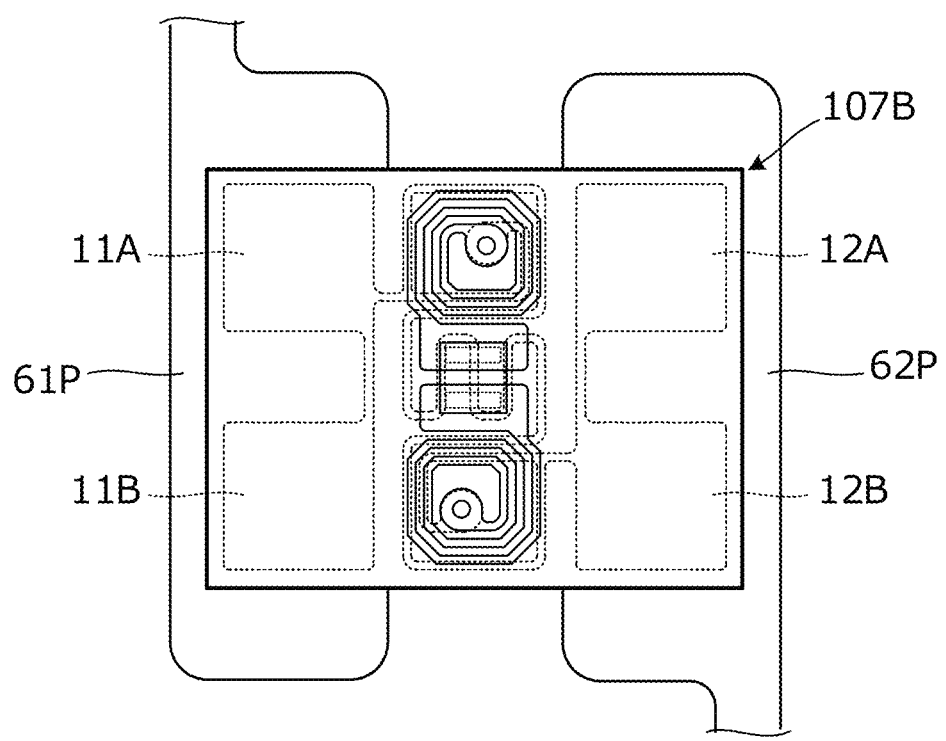
FIG. 22 is an enlarged plan view of a mounting portion for another RFIC module 107B according to the seventh embodiment, on the insulating film.

FIG. 21 is an enlarged plan view of the mounting portion for an RFIC module 107A according to the seventh embodiment on the insulating film, and FIG. 22 is an enlarged plan view of the mounting portion for another RFIC module 107B according to the seventh embodiment on the insulating film. It is noted that these figures do not illustrate the outline of the insulating film. The impedance matching circuit has a basic configuration that is similar to those in the example described above.

The RFIC module 107A illustrated in FIG. 21 includes antenna side first terminal electrodes 11A and 11B and antenna side second terminal electrodes 12A and 12B. The antenna side first terminal electrodes 11A and 11B are electrically connected and are separately arranged in a direction orthogonal to the arrangement direction of the first inductor L1 and the second inductor L2. Similarly, the antenna side second terminal electrodes 12A and 12B are electrically connected and are separately arranged in a direction orthogonal to the arrangement direction of the first inductor L1 and the second inductor L2.

The RFIC module 107B illustrated in FIG. 22 also includes the antenna side first terminal electrodes 11A and 11B and the antenna side second terminal electrodes 12A and 12B. The antenna side first terminal electrodes 11A and 11B are electrically connected and are separately arranged in the arrangement direction of the first inductor L1 and the second inductor L2. Similarly, the antenna side second terminal electrodes 12A and 12B are electrically connected and are separately arranged in the arrangement direction of the first inductor L1 and the second inductor L2.

As described in the present embodiment, a plurality of antenna side first terminal electrodes and a plurality of antenna side second terminal electrodes may be separately arranged.

The impedance matching circuit obtained by the conductor patterns formed on the substrate 1 of the RFIC modules 107A and 107B is not limited to the circuit described above.

Eighth Embodiment

An eighth embodiment relates to an example of an RFIC module with the arrangement of the plurality of antenna side first terminal electrodes 11 and the plurality of antenna side second terminal electrodes 12 being different from those in the examples described above.

Figure 23:
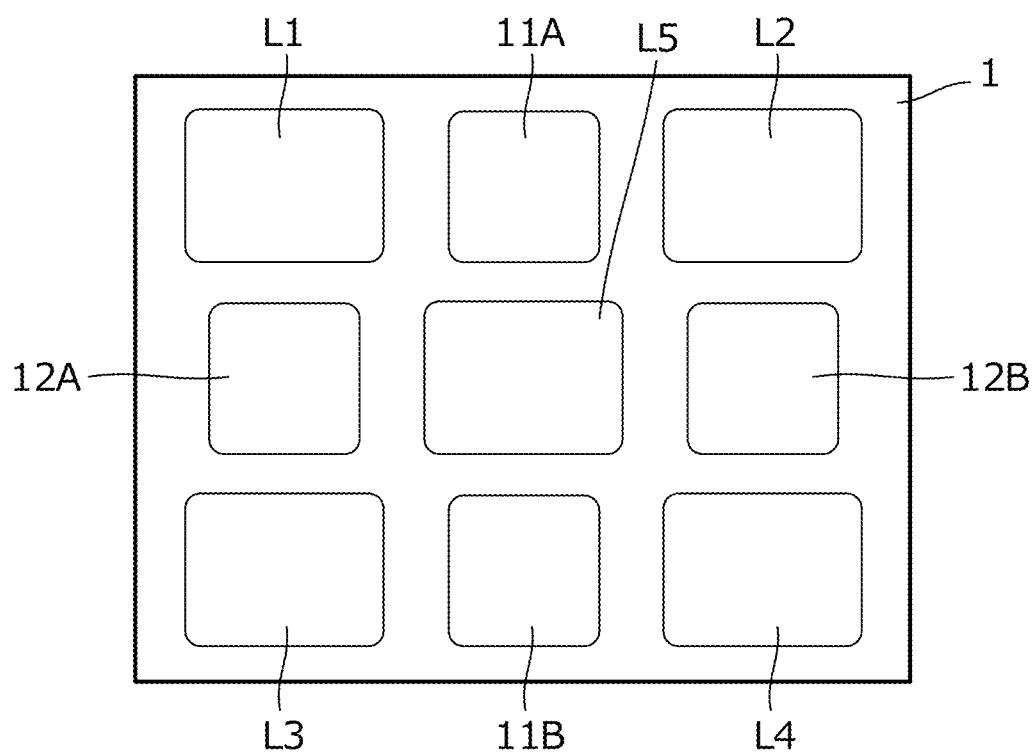
FIG. 23 is a plan view of an RFIC module 108A according to an eighth embodiment.

FIG. 23 is a plan view of an RFIC module 108A according to the eighth embodiment. The RFIC module 108A includes the antenna side first terminal electrodes 11A and 11B and the antenna side second terminal electrodes 12A and 12B on the substrate 1. The substrate 1 is provided with the plurality of inductors L1, L2, L3, L4, and L5 forming the impedance matching circuit.

In the examples described above, the formation regions of the inductors L1 to L5 that form the impedance matching circuit are continuous. However, the formation regions may be separately arranged for the respective inductors in this example. Furthermore, the arrangement direction of the antenna side first terminal electrodes 11A, 11B and the arrangement direction of the antenna side second terminal electrodes 12A, 12B may intersect each other.

Figure 24:
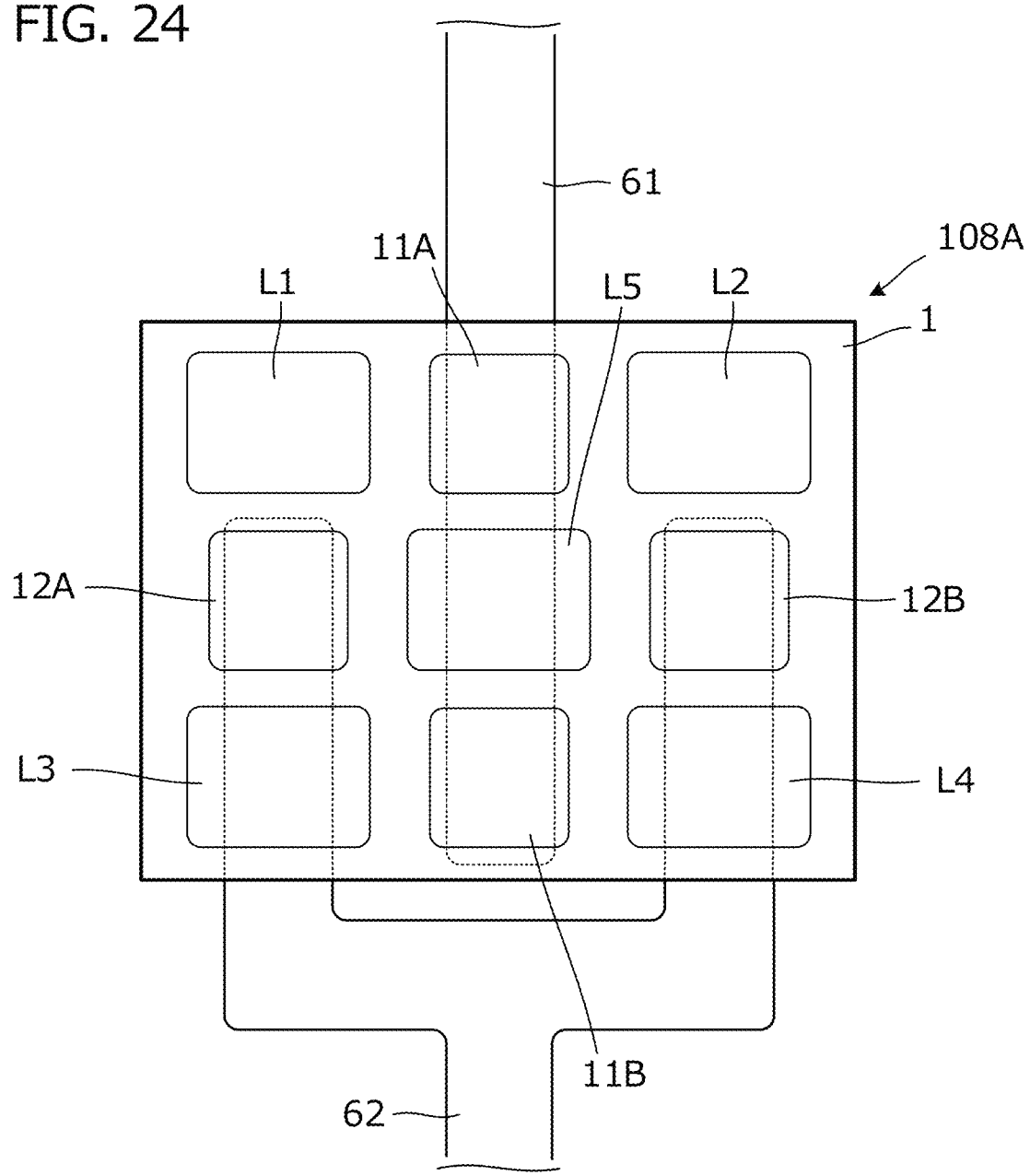
FIG. 24 is an enlarged plan view of a mounting portion for the RFIC module 108A according to the eighth embodiment, on the insulating film.

FIG. 24 is an enlarged plan view of a mounting portion for the RFIC module 108A according to the eighth embodiment, on the insulating film. It is noted that FIG. 24 does not illustrate the outline of the insulating film. The antenna side first terminal electrodes 11A and 11B face portions near the ends of the conductor pattern 61 of the antenna. The antenna side second terminal electrodes 12A and 12B face portions near the ends of the conductor pattern 62 of the antenna.

Figure 25:
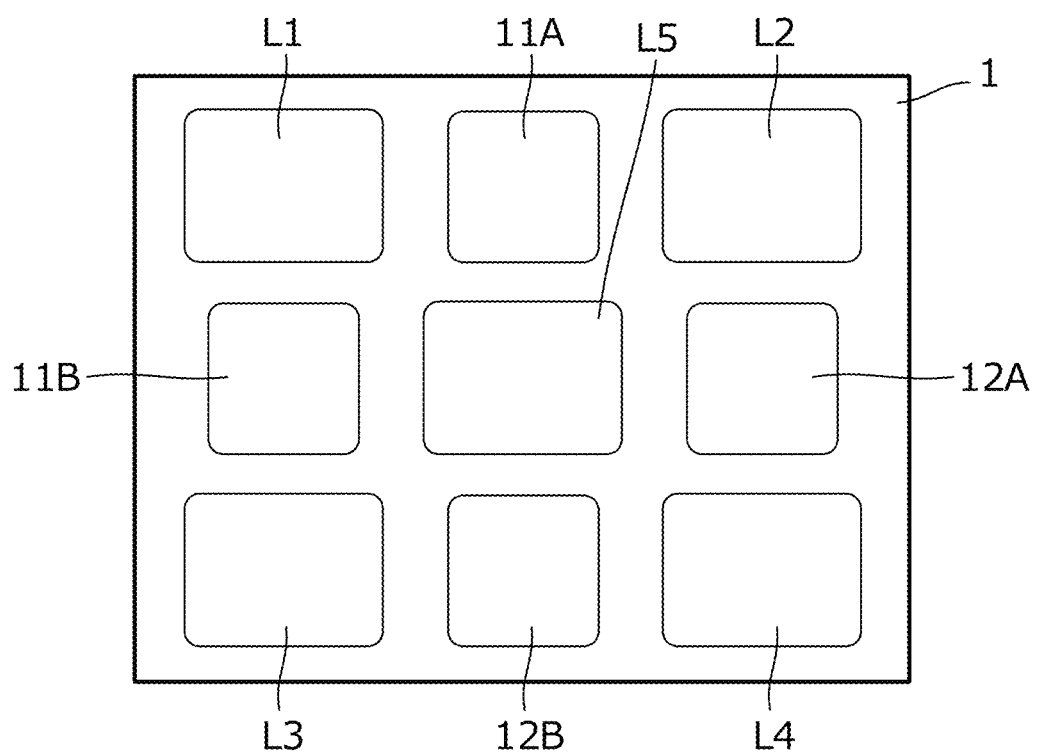
FIG. 25 is a plan view of another RFIC module 108B according to the eighth embodiment.

FIG. 25 is a plan view of an RFIC module 108B according to the eighth embodiment. The RFIC module 108B has the substrate 1 provided with each of the antenna side first terminal electrodes 11A and 11B, the antenna side second terminal electrode 12A and 12B, and the plurality of inductors L1, L2, L3, L4, and L5 forming the impedance matching circuit. The arrangement direction of the antenna side first terminal electrodes 11A and 11B and the arrangement direction of the antenna side second terminal electrodes 12A and 12B are in parallel with each other, and are inclined with respect to the sides of the substrate 1.

Figure 26:
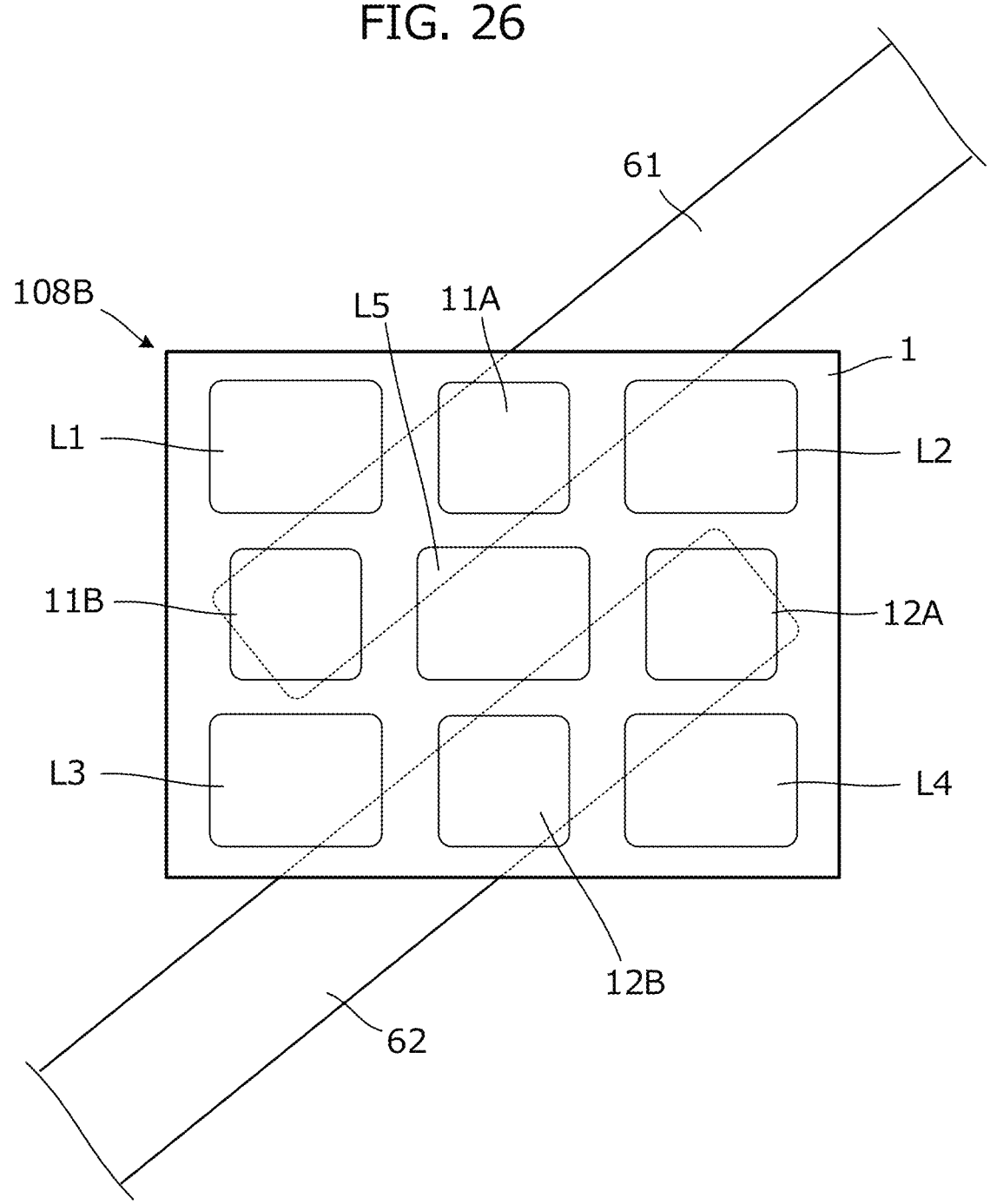
FIG. 26 is an enlarged plan view of a mounting portion for the RFIC module 108B according to the eighth embodiment, on the insulating film.

FIG. 26 is an enlarged plan view of a mounting portion for the RFIC module 108B according to the eighth embodiment, on the insulating film. It is again noted that this figure does not illustrate the outline of the insulating film. The antenna side first terminal electrodes 11A and 11B face the conductor pattern 61 of the antenna. The antenna side second terminal electrodes 12A and 12B face the conductor pattern 62 of the antenna.

Figure 27:
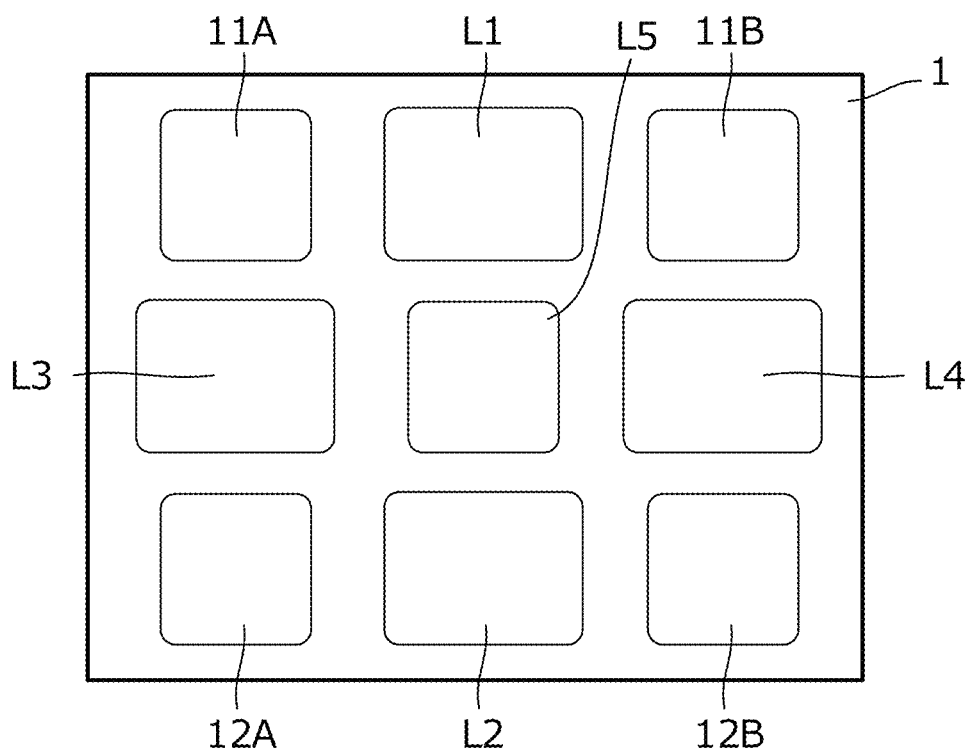
FIG. 27 is an enlarged plan view of a mounting portion for an RFIC module 108C according to the eighth embodiment, on the insulating film.

FIG. 27 is an enlarged plan view of a mounting portion for an RFIC module 108C according to the eighth embodiment, on the insulating film. In this example, the antenna side first terminal electrodes 11A and 11B and the antenna side second terminal electrodes 12A and 12B are arranged at the four corners of the substrate 1, which are the blanks of the forming positions of the inductors L1 to L5.

The impedance matching circuit obtained by the conductor patterns formed on the substrate 1 of the RFIC modules 108A, 108B, and 108C is not limited to the circuit described above.

Ninth Embodiment

A ninth embodiment relates to an example of an RFIC module with the forming positions of the antenna side terminal electrode and the impedance matching circuit on the substrate being different from those in the examples described above.

FIGS. 28A to 28J are plan views of the RFIC module according to the ninth embodiment. In the examples illustrated in FIGS. 28A to 28F, the substrate 1 is provided with the antenna side first terminal electrodes 11A and 11B, the antenna side second terminal electrodes 12A and 12B, and the impedance matching circuit 7. In the examples illustrated in FIGS. 28G to 28J, the substrate 1 is provided with the antenna side first terminal electrodes 11A and 11B, the antenna side second terminal electrodes 12A and 12B, and impedance matching circuits 7a and 7b.

Figure 28A:
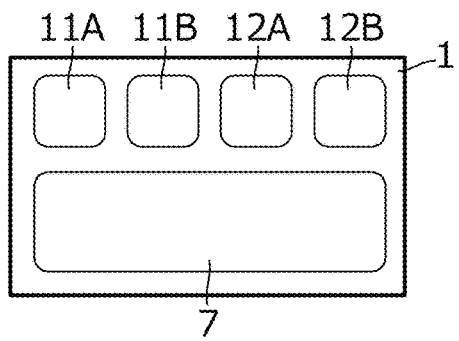
FIGS. 28A to 28J are plan views of an RFIC module according to a ninth embodiment.
Figure 28F:
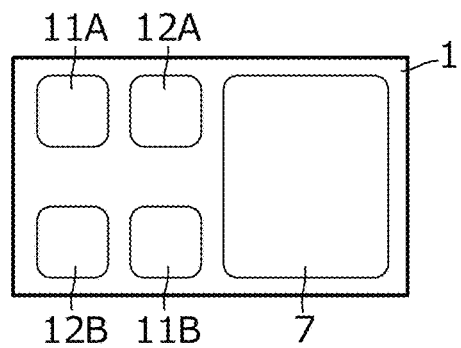
Figure 28B:
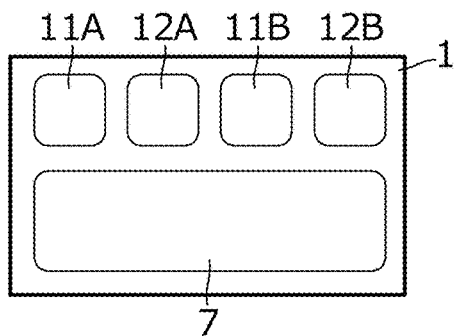
Figure 28G:
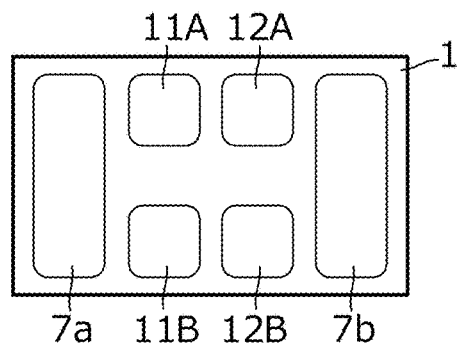
Figure 28C:
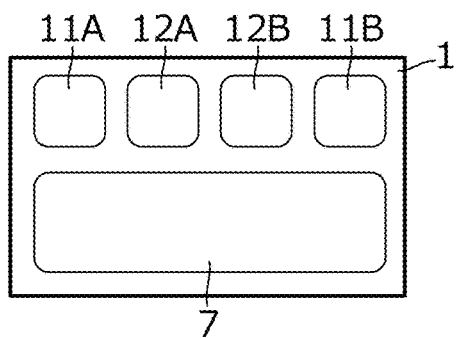

As shown in the example of FIGS. 28A, 28B, and 28C, the antenna side first terminal electrodes 11A and 11B and the antenna side second terminal electrodes 12A and 12B are arranged in a single row. The row of these terminal electrodes and the impedance matching circuit 7 are arranged in parallel.

Figure 28H:
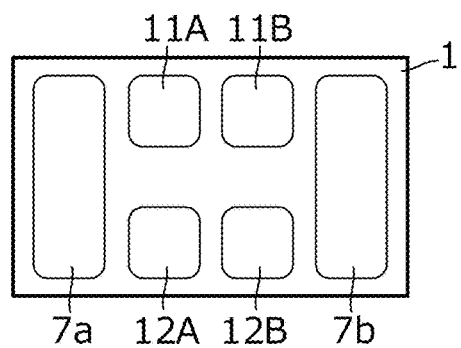
Figure 28D:
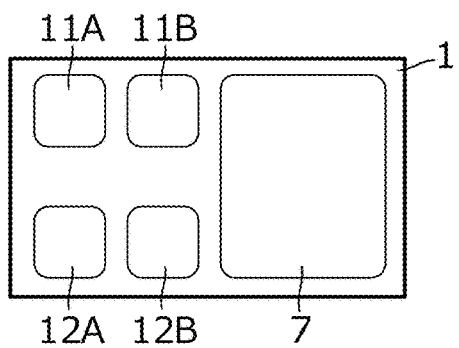
Figure 28I:
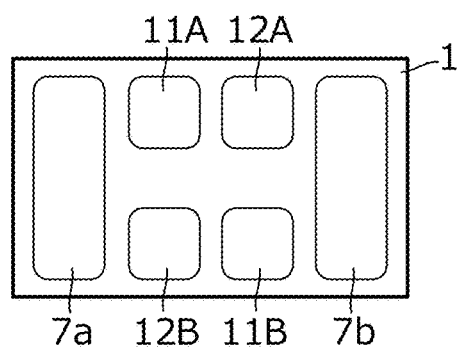
Figure 28E:
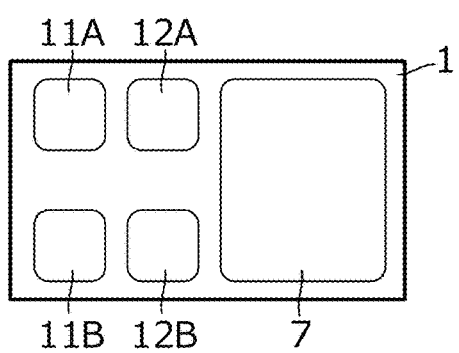

Moreover, as shown in the example of FIGS. 28D, 28E, and 28F, the antenna side first terminal electrodes 11A and 11B and the antenna side second terminal electrodes 12A and 12B are arranged together, and the impedance matching circuit 7 is arranged in the remaining spaces.

Furthermore, as shown in the example of FIGS. 28G, 28H, and 28I, the antenna side first terminal electrodes 11A and 11B and the antenna side second terminal electrodes 12A and 12B are arranged together, and the impedance matching circuits 7a and 7b are separately arranged on both sides thereof.

FIGS. 28A, 28B, and 28C are different from each other in the order of arrangement of the antenna side first terminal electrodes 11A and 11B and the antenna side second terminal electrode 12A and 12B. FIGS. 28D, 28E, and 28F are different from each other in the arrangement positions of the antenna side first terminal electrodes 11A and 11B and the antenna side second terminal electrode 12A and 12B. FIGS. 28G, 28H, and 28I are also different from each other in the arrangement positions of the antenna side first terminal electrodes 11A and 11B and the antenna side second terminal electrode 12A and 12B.

Figure 28J:
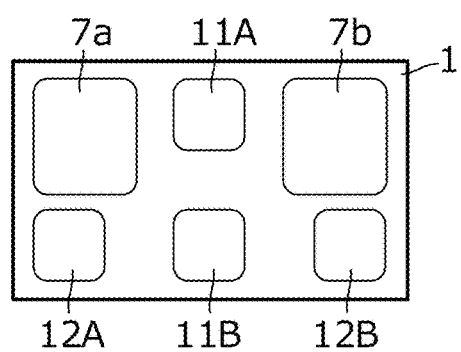

In the example of FIG. 28J, the antenna side first terminal electrodes 11A and 11B and the antenna side second terminal electrodes 12A and 12B are arranged in an intersecting manner to form a T-shape. The impedance matching circuits 7a and 7b are separately arranged in the remaining spaces.

It is noted that arrangements obtained by inverting those in FIGS. 28A to 28J in the left and right direction or in the upward and downward direction may also be employed as would be appreciated to one skilled in the art. The impedance matching circuit obtained by the conductor patterns formed on the substrate 1 of each RFIC module is not limited to the circuit described above.

As described above, the antenna side terminal electrode and the impedance matching circuit may be formed at various positions with respect to the substrate.

Tenth Embodiment

A tenth embodiment relates to the positional relationship and the size relationship of the conductor patterns 61P and 62P of the antenna relative to the antenna side first terminal electrode 11 and the antenna side second terminal electrode 12 of the RFIC module.

Figure 29:
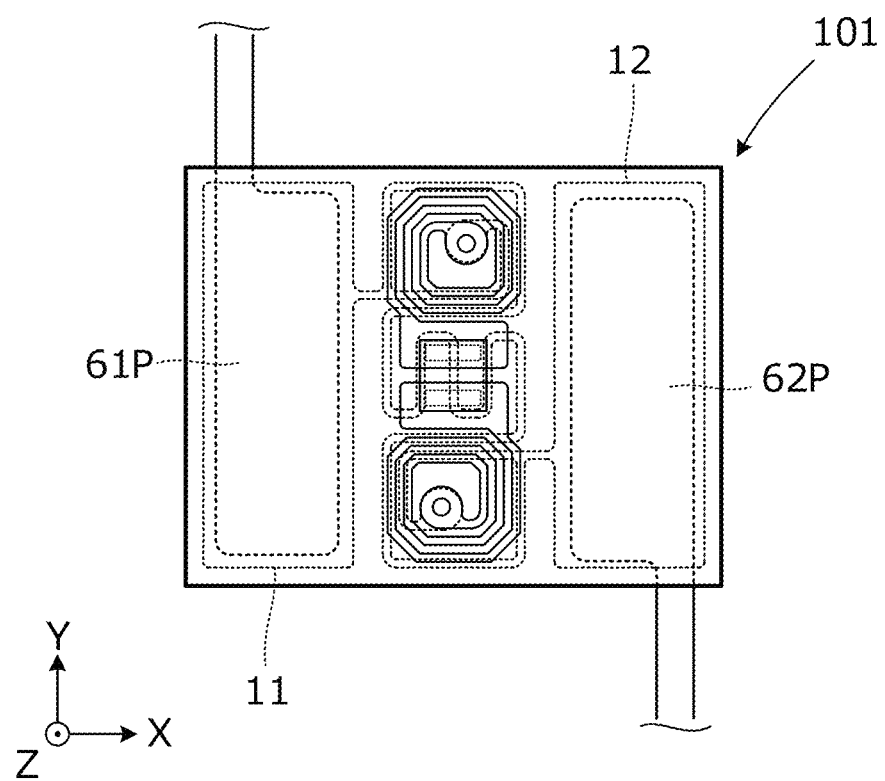
FIG. 29 is a plan view illustrating the positional relationship and the size relationship between an RFIC module 101 and conductor patterns 61P and 62P of an RFID tag according to a tenth embodiment.

FIG. 29 is a plan view illustrating the positional relationship and the size relationship between the RFIC module 101 and the conductor patterns 61P and 62P of the antenna of the RFID tag according to the tenth embodiment. In this example, the entire conductor pattern 61P of the antenna is arranged without protruding beyond the antenna side first terminal electrode 11 as viewed in the Z direction (in plan view). Similarly, the entire conductor pattern 62P of the antenna is arranged without protruding beyond the antenna side second terminal electrode 12.

Figure 30A:
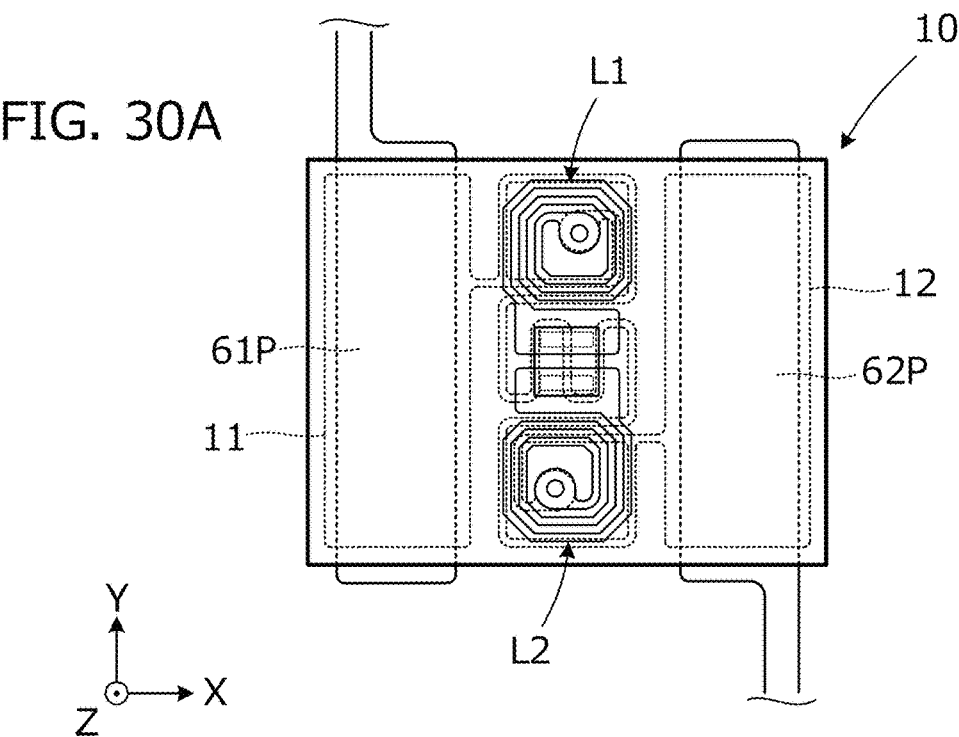
FIGS. 30A and 30B are plan views illustrating the positional relationship and the size relationship between the RFIC module 101 and the conductor patterns 61P and 62P of the RFID tag according to the tenth embodiment.
Figure 30B:
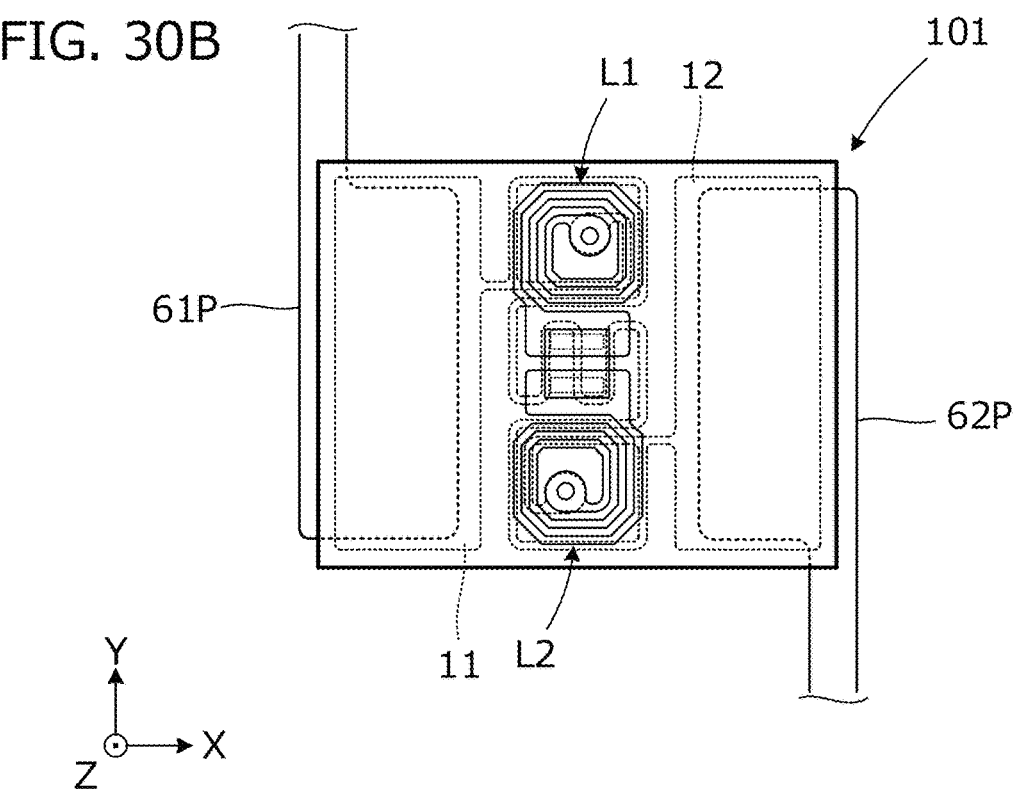

FIGS. 30A and 30B are plan views illustrating the positional relationship and the size relationship between the RFIC module 101 and the conductor patterns 61P and 62P of the RFID tag according to the tenth embodiment. In the example illustrated in FIG. 30A, the entire width of the conductor pattern 61P of the antenna in the X direction is arranged without protruding beyond the antenna side first terminal electrode 11 as viewed in plan view. Similarly, the entire width of the conductor pattern 62P of the antenna in the X direction is arranged without protruding beyond the antenna side second terminal electrode 12. In the example illustrated in FIG. 30B, substantially the entire width of the conductor pattern 61P of the antenna in the Y direction is arranged without protruding beyond the antenna side first terminal electrode 11 as viewed in plan view. Similarly, substantially the entire width of the conductor pattern 62P of the antenna in the Y direction is arranged without protruding beyond the antenna side second terminal electrode 12.

Figure 31A:
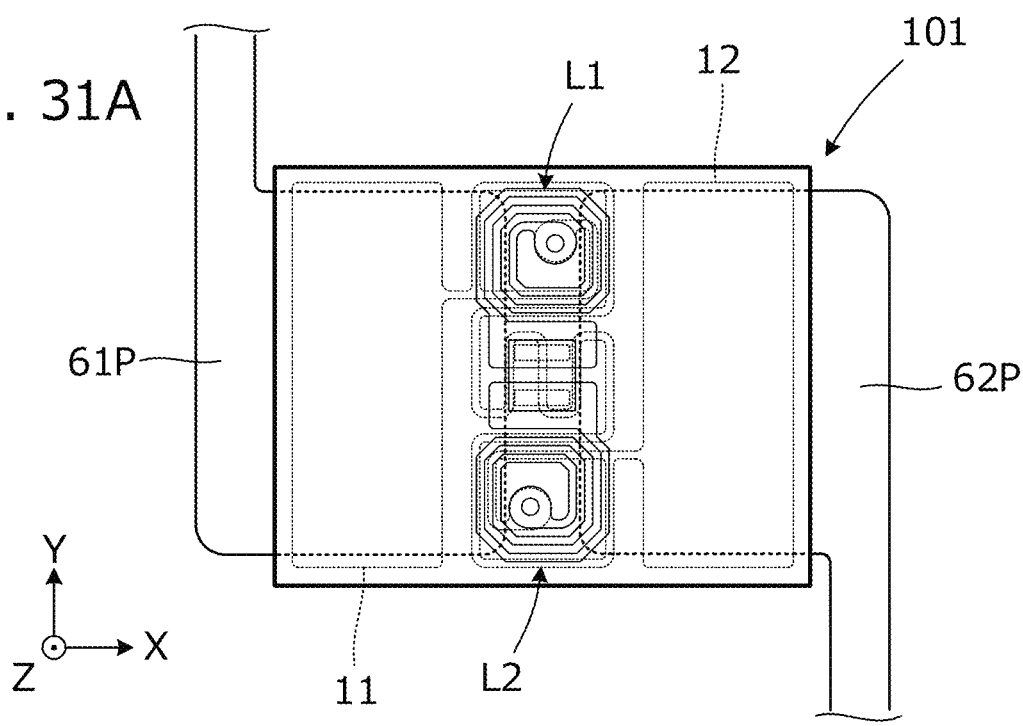
FIGS. 31A and 31B are plan views illustrating the positional relationship and the size relationship between the RFIC module 101 and the conductor patterns 61P and 62P of the RFID tag according to the tenth embodiment.
Figure 31B:
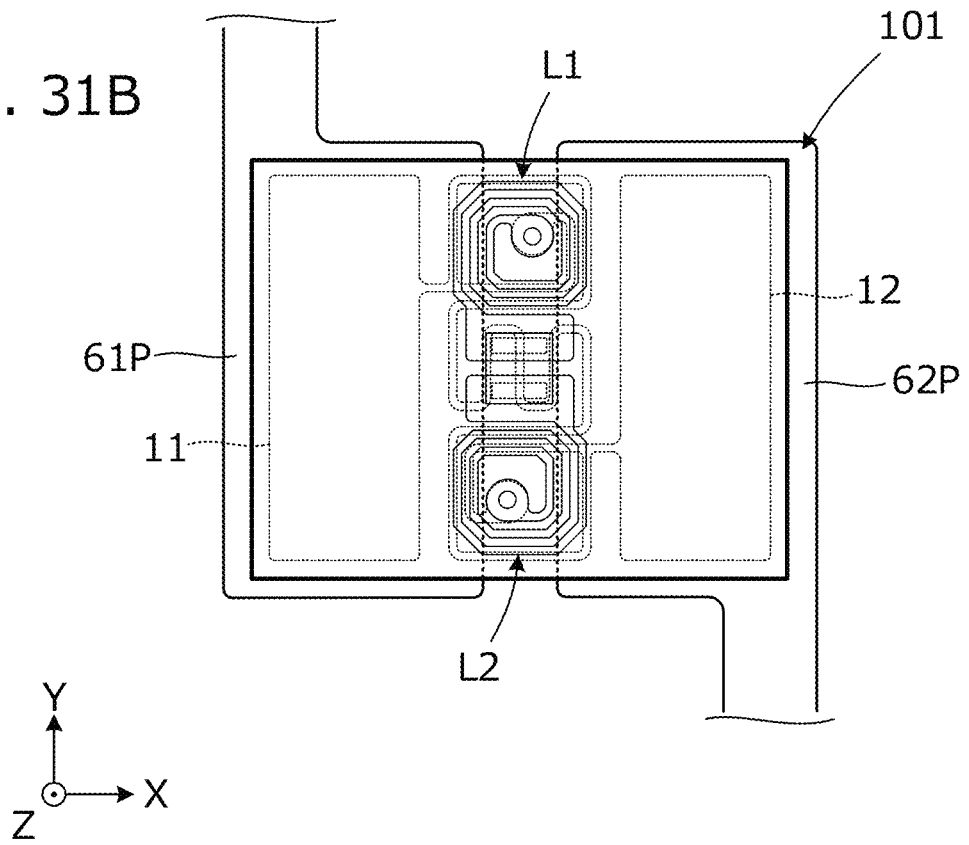

FIGS. 31A and 31B are plan views illustrating the positional relationship and the size relationship between the RFIC module 101 and the conductor patterns 61P and 62P of the RFID tag according to the tenth embodiment. In any of the examples, the end portion of the conductor pattern 61P of the antenna in the X direction overlaps the formation region of the impedance matching circuit formed by the first inductor L1, the second inductor L2, and the like in plan view. In the example illustrated in FIG. 31B, the entire antenna side first terminal electrode 11 is arranged without protruding beyond the conductor pattern 61P of the antenna. Similarly, the entire antenna side second terminal electrode 12 is arranged without protruding beyond the conductor pattern 62P of the antenna.

In the example illustrated in FIGS. 30A and 31A, even when a displacement of the RFIC module 101 occurs in the X direction with respect to the insulating film on which the conductor patterns of the antenna are formed, a change in the coupling capacitance of the antenna side first terminal electrode 11 and the antenna side second terminal electrode 12 with respect to the conductor patterns 61P and 62P of the antenna is small. Furthermore, in any of the examples illustrated in FIG. 29, FIGS. 30A, 30B, 31A, and 31B, even when a displacement of the RFIC module 101 occurs in the Y direction with respect to the insulating film on which the conductor patterns of the antenna are formed, a change in the coupling capacitance described above is small.

The impedance matching circuit obtained by the conductor patterns formed on the substrate 1 of the RFIC module 101 described in the present embodiment is not limited to the circuit described above.

Eleventh Embodiment

An eleventh embodiment relates to an example of an RFIC module including the RFIC 2 as well as other components.

Figure 32A:
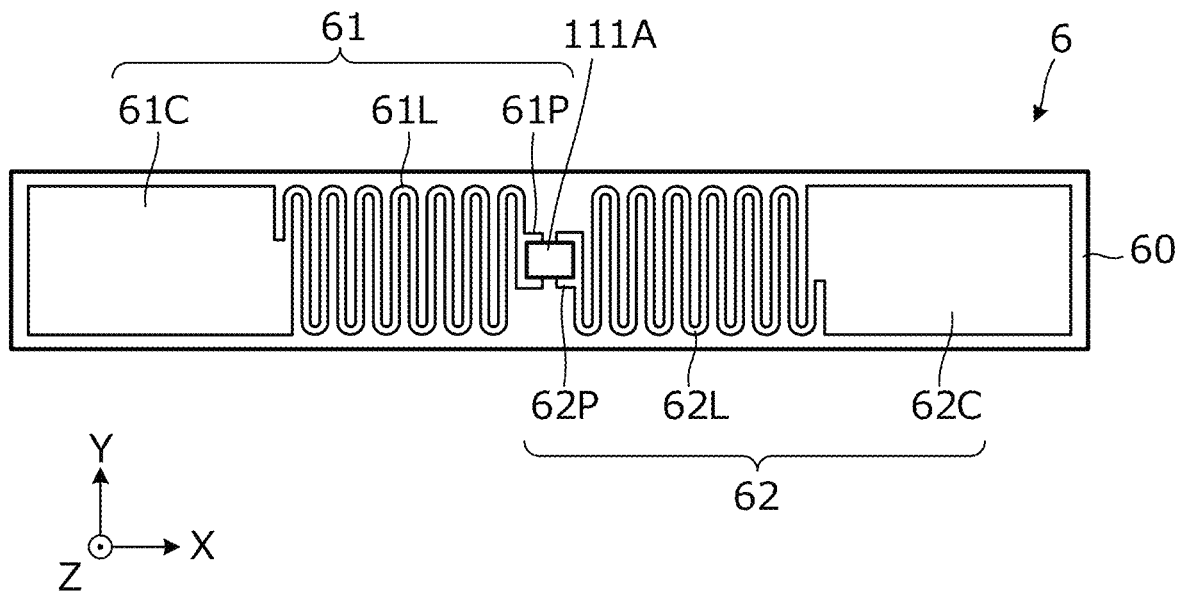
FIG. 32A is a plan view of an RFID tag 211 according to an eleventh embodiment.
Figure 32B:
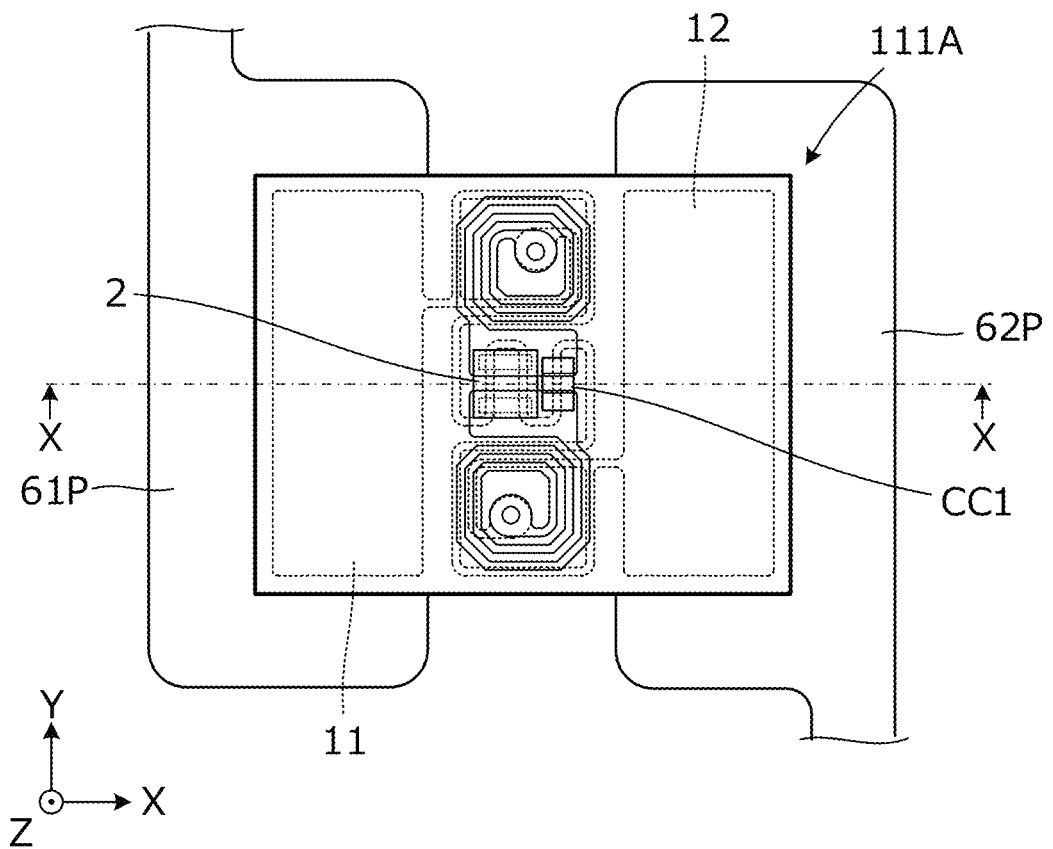
FIG. 32B is an enlarged plan view of a mounting portion for an RFIC module 111A in the RFID tag 211.

FIG. 32A is a plan view of an RFID tag 211 according to the eleventh embodiment. FIG. 32B is an enlarged plan view of a mounting portion for an RFIC module 111A in the RFID tag 211.

The RFID tag 211 includes an antenna 6 and the RFIC module 111A coupled to the antenna 6. The antenna 6 includes an insulating film 60 and conductor patterns 61 and 62 formed on the insulating film 60. It is noted that the configurations of the insulating film 60 and the conductor patterns 61 and 62 are the same as those described in the first embodiment.

The conductor pattern 61 includes conductor patterns 61P, 61L, and 61C, and the conductor pattern 62 includes conductor patterns 62P, 62L, and 62C. The conductor patterns 61 and 62 form a dipole antenna. The RFIC module 111A is mounted on the conductor patterns 61P and 62P.

Figure 33:
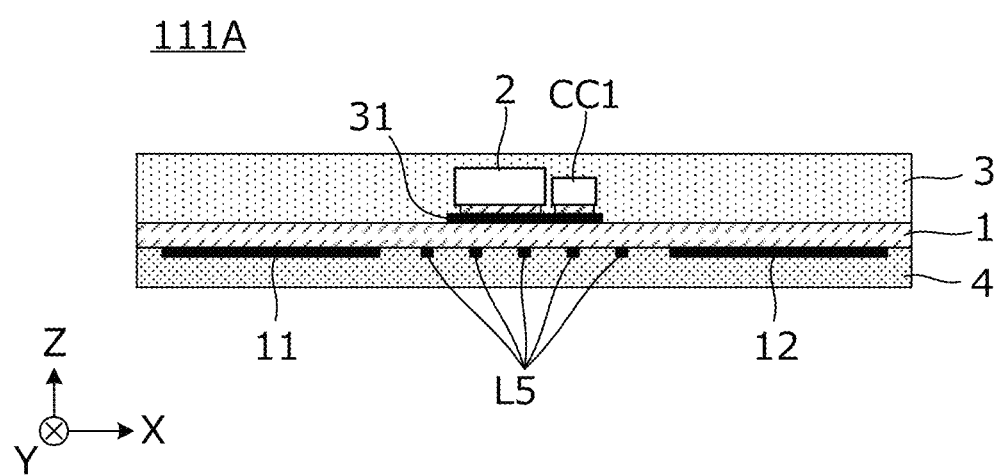
FIG. 33 is a cross-sectional view of the RFIC module 111A.

FIG. 33 is a cross-sectional view of the RFIC module 111A. The RFIC module 111A includes a substrate 1 as well as an RFIC 2 and a chip capacitor CC1 mounted on the substrate 1. The upper surface of the substrate 1, on which the RFIC 2 and the chip capacitor CC1 are mounted, is covered with a protective film 3. Moreover, the substrate 1 has a lower surface provided with a coverlay film 4. In general, it should be appreciated that the basic configuration of the substrate 1 is as described in the first embodiment.

Figure 34:
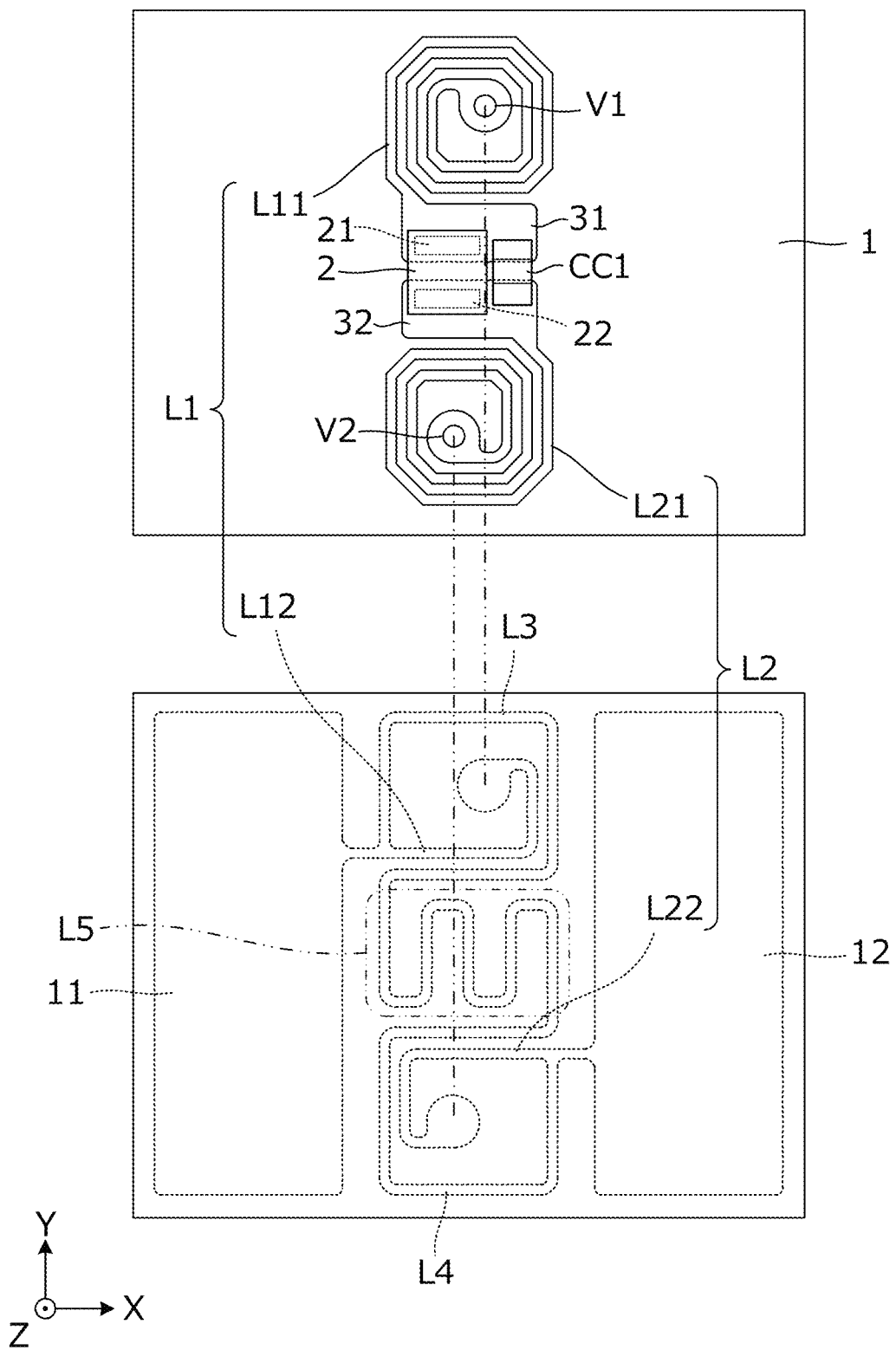
FIG. 34 is a plan view of conductor patterns formed in each layer of a substrate 1 of the RFIC module 111A.

FIG. 34 is a plan view of conductor patterns formed on the substrate 1 of the RFIC module 111A. An upper part of FIG. 34 is a plan view of conductor patterns formed on the upper surface of the substrate 1, and a lower part of FIG. 34 is a plan view of conductor patterns formed on the lower surface of the substrate 1.

The upper surface of the substrate 1 is provided with an RFIC side first terminal electrode 31, an RFIC side second terminal electrode 32, a conductor pattern L11 that is a main part of a first inductor L1, and a conductor pattern L21 that is a main part of a second inductor L2. The RFIC side first terminal electrode 31 is connected to a first end of the conductor pattern L11, and the RFIC side second terminal electrode 32 is connected to a first end of the conductor pattern L21.

The lower surface of the substrate 1 is provided with an antenna side first terminal electrode 11 and an antenna side second terminal electrode 12 that are capacitively coupled to the conductor patterns 61P and 62P of the antenna 6. The lower surface of the substrate 1 is further provided with a conductor pattern L12 that is a part of the first inductor L1, a conductor pattern L22 that is a part of the second inductor, a conductor pattern of a third inductor L3, a conductor pattern of a fourth inductor L4, and a conductor pattern of a fifth inductor L5. The basic configuration of these conductor patterns is as described in the first embodiment.

The RFIC 2 is mounted on the RFIC side first terminal electrode 31 and the RFIC side second terminal electrode 32. That is, a terminal 21 and a terminal 22 of the RFIC 2 are respectively connected to the RFIC side first terminal electrode 31 and the RFIC side second terminal electrode 32. The chip capacitor CC1 is mounted on the RFIC side first terminal electrode 31 and the RFIC side second terminal electrode 32, and connected between the RFIC side first terminal electrode 31 and the RFIC side second terminal electrode 32.

Figure 35:
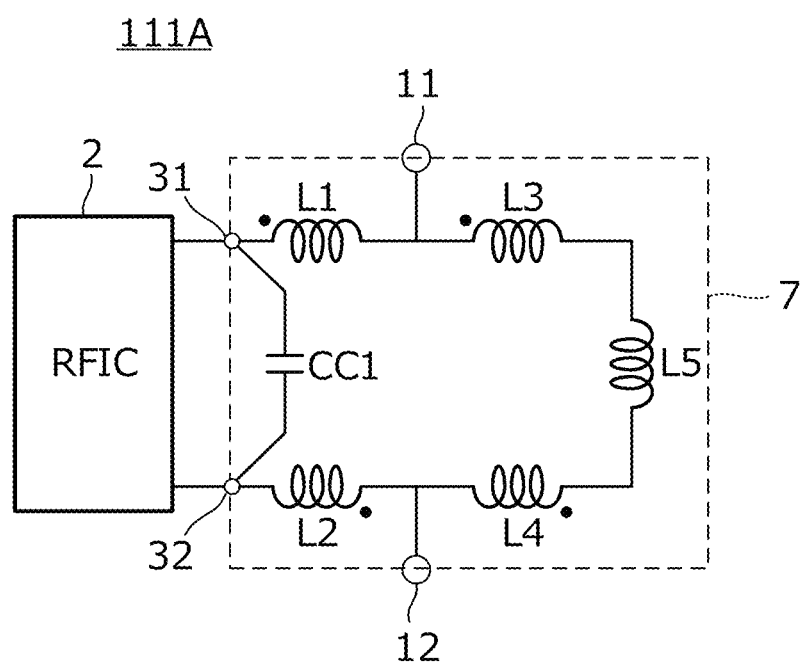
FIG. 35 is a circuit diagram of the RFIC module 111A.

FIG. 35 is a circuit diagram of the RFIC module 111A. The RFIC module 111A includes the RFIC 2 and an impedance matching circuit 7. As shown, the impedance matching circuit 7 is connected to the RFIC side first terminal electrode 31, the RFIC side second terminal electrode 32, the antenna side first terminal electrode 11, and the antenna side second terminal electrode 12. The impedance matching circuit 7 includes the first inductor L1, the second inductor L2, the third inductor L3, the fourth inductor L4, the fifth inductor L5, and the chip capacitor CC1. As further shown, the chip capacitor CC1 is connected between the RFIC side first terminal electrode 31 and the RFIC side second terminal electrode 32.

The first inductor L1 includes the conductor patterns L11 and L12 illustrated in FIG. 34, and the second inductor L2 includes the conductor patterns L21 and L22 illustrated in FIG. 34. The first inductor L1 is connected between the antenna side first terminal electrode 11 and the RFIC side first terminal electrode 31. The second inductor L2 is connected between the antenna side second terminal electrode 12 and the RFIC side second terminal electrode 32. A first end of the third inductor L3 is connected to the antenna side first terminal electrode 11, a first end of the fourth inductor L4 is connected to the antenna side second terminal electrode 12, and the fifth inductor L5 is connected between the second end of the third inductor L3 and the second end of the fourth inductor.

In the present embodiment, the chip capacitor CC1 is provided as a part of the impedance matching circuit 7. The capacitances of the capacitors Ca, C11, C12 illustrated in FIG. 8 in the first embodiment are determined by the configuration of the conductor patterns of the RFIC module 101 and are constant. On the other hand, the characteristics of the RFIC 2 mounted on the substrate 1 are not always constant. Under such circumstances, in order to properly perform impedance matching between the impedance of the input/output unit of the RFIC 2 and the antenna by the conductor patterns 61 and 62, the chip capacitor CC1 having a capacitance according to the characteristics of the RFIC 2 may be selected. Therefore, according to the present embodiment, it is possible to employ a plurality of types of RFIC 2 having different impedances in the input/output unit.

Figure 36:
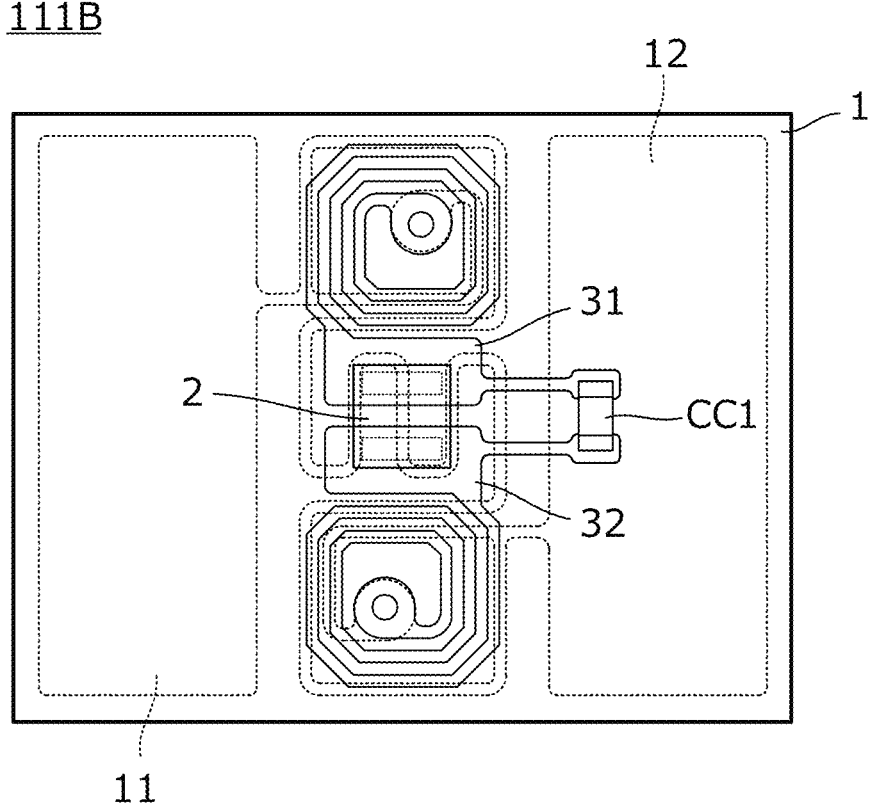
FIG. 36 is a plan view of another RFIC module 111B according to the eleventh embodiment.

FIG. 36 is a plan view of yet another RFIC module 111B according to the eleventh embodiment. In this example, a conductor pattern extending from the RFIC side first terminal electrode 31 and the RFIC side second terminal electrode 32 is formed, and the chip capacitor CC1 is mounted on the conductor pattern. In this way, the chip capacitor CC1 may be separated from the RFIC 2.

The impedance matching circuit of the RFIC modules 111A and 111B is not limited to the circuit described above.

Twelfth Embodiment

The twelfth embodiment illustrates an example of an RFIC module and an RFID tag capable of mounting a chip capacitor according to the characteristics of the antenna.

Figure 37A:
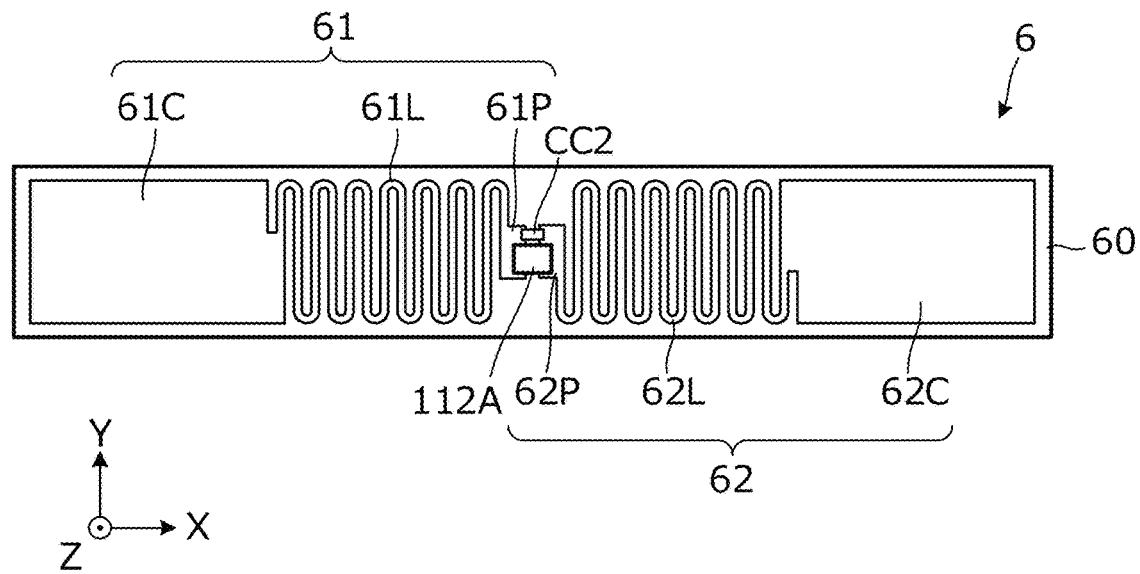
FIG. 37A is a plan view of an RFID tag 212 according to a twelfth embodiment.
Figure 37B:
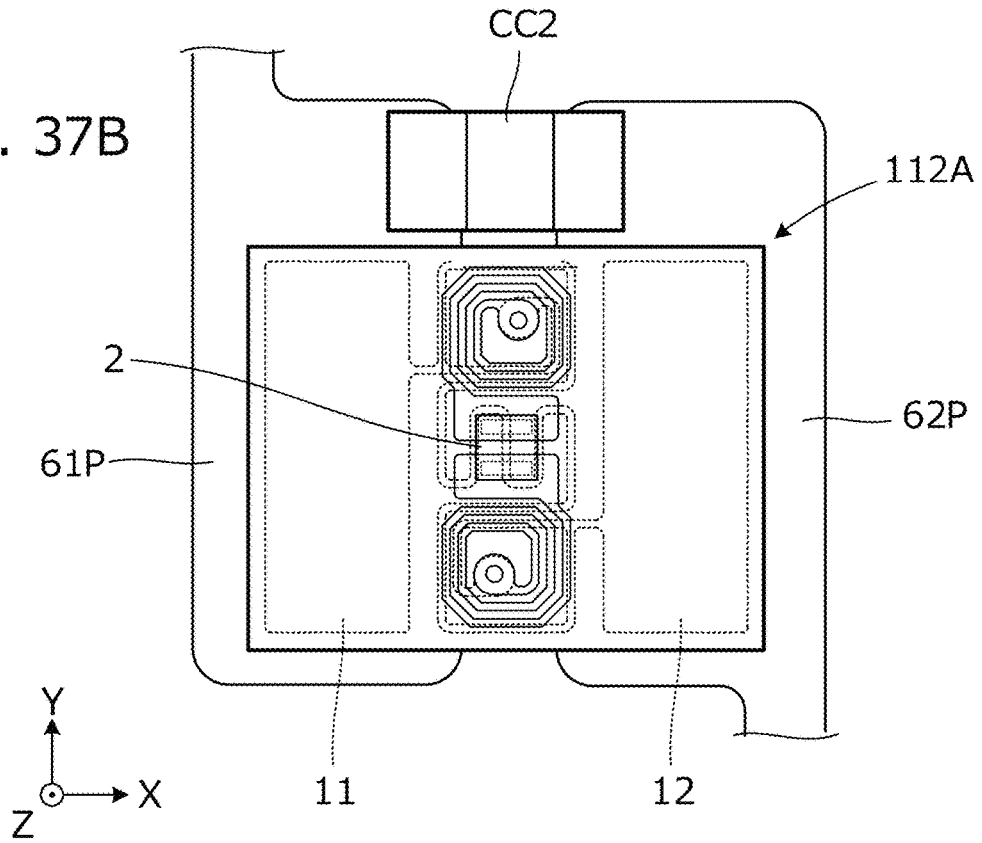
FIG. 37B is an enlarged plan view of a mounting portion for an RFIC module 112A in the RFID tag 212.

FIG. 37A is a plan view of an RFID tag 212 according to the twelfth embodiment. FIG. 37B is an enlarged plan view of a mounting portion for an RFIC module 112A in the RFID tag 212.

The RFID tag 212 includes an antenna 6 and the RFIC module 112A coupled to the antenna 6. The antenna 6 includes an insulating film 60 and conductor patterns 61 and 62 formed on the insulating film 60.

Similar to the example illustrated in the eleventh embodiment, the conductor pattern 61 includes conductor patterns 61P, 61L, and 61C, and the conductor pattern 62 includes conductor patterns 62P, 62L, and 62C. The conductor patterns 61 and 62 form a dipole antenna.

The RFIC module 112A and a chip capacitor CC2 are mounted on the conductor patterns 61P and 62P.

Figure 38:
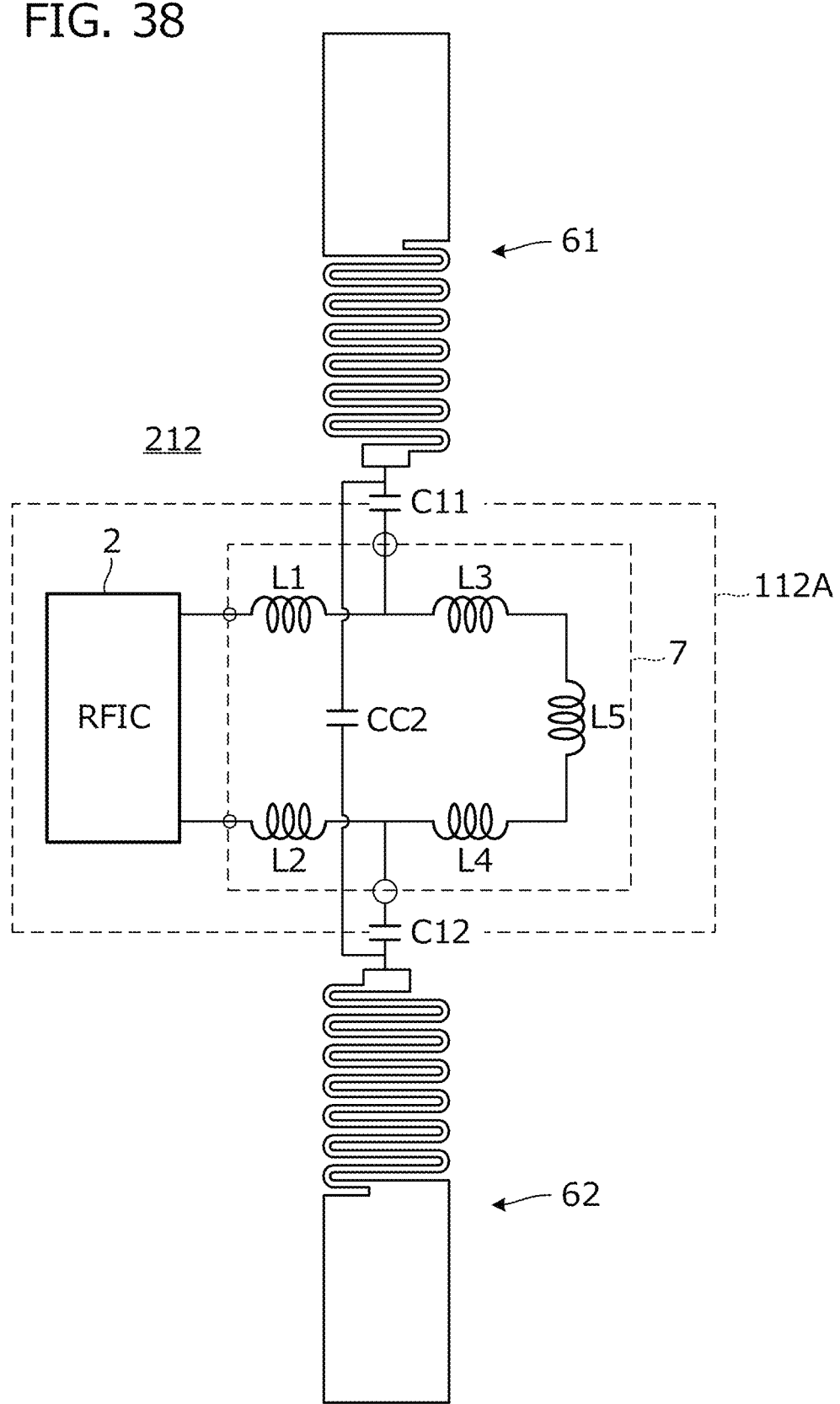
FIG. 38 is a circuit diagram of the RFID tag 212.

FIG. 38 is a circuit diagram of the RFID tag 212. The RFIC module 112A includes the RFIC 2 and an impedance matching circuit 7. The impedance matching circuit 7 includes a first inductor L1, a second inductor L2, a third inductor L3, a fourth inductor L4, and a fifth inductor L5. The chip capacitor CC2 is connected between the root of the conductor pattern 61 and the root of the conductor pattern 62.

The chip capacitor CC2 is connected in parallel to the capacitor Ca, which is a capacitive component generated between the conductor patterns 61 and 62 of the antenna illustrated in FIG. 8.

The capacitances of the capacitors Ca, C11, and C12 illustrated in FIG. 8 are determined by the configuration of the conductor patterns of the RFIC module 112A and are constant. On the other hand, the antenna 6 and the RFIC module 112A are separate components and can be designed independently. According to the present embodiment, the value of the capacitor Ca, which is a capacitive component generated between the conductor patterns 61 and 62, can be changed by the capacitance of the chip capacitor CC2, and thus the conductor patterns 61 and 62 of the antenna 6 are not necessarily constant. That is, under such circumstances, the chip capacitor CC2 having a capacitance corresponding to the conductor patterns 61, 62 may be selected and mounted.

Figure 39:
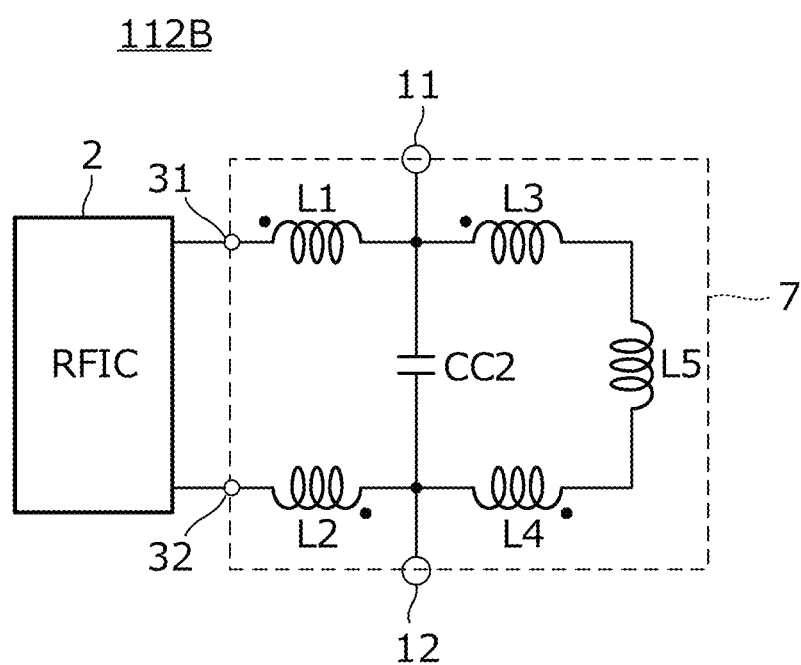
FIG. 39 is a circuit diagram of another RFIC module 112B according to the twelfth embodiment.

FIG. 39 is a circuit diagram of another RFIC module 112B according to the twelfth embodiment. The RFIC module 112B includes the RFIC 2 and the impedance matching circuit 7. The impedance matching circuit 7 includes the first inductor L1, the second inductor L2, the third inductor L3, the fourth inductor L4, the fifth inductor L5, and the chip capacitor CC2. The chip capacitor CC2 is connected between the antenna side first terminal electrode 11 and the antenna side second terminal electrode 12. According to the present embodiment, the capacitance between the antenna side first terminal electrode 11 and the antenna side second terminal electrode 12 can be changed by the capacitance of the chip capacitor CC2, and thus the conductor patterns 61 and 62 of the antenna 6 are not necessarily constant. That is, under such circumstances, the chip capacitor CC2 having a capacitance corresponding to the conductor patterns 61, 62 may be selected and mounted.

The impedance matching circuit of the RFIC modules 112A and 112B is not limited to the circuit described above.

Finally, the above description of the embodiments is illustrative in all respects and not restrictive. Those skilled in the art can make modifications and changes as appropriate. The scope of the present invention is indicated by the claims rather than the embodiments described above. Furthermore, the scope of the present invention includes modifications from the embodiments within the scope equivalent to the claims.

For example, while the antenna side first terminal electrode 11 and the conductor pattern 61P of the antenna are capacitively coupled and the antenna side second terminal electrode 12 and the conductor pattern 62P of the antenna are capacitively coupled in the example illustrated in FIG. 5B, this capacitive coupling portion may be directly (in a direct current manner) connected. Alternatively, one may be directly connected and the other may be capacitively coupled.

What is claimed:

1. An RFIC module comprising:
   a substrate;
   an RFIC mounted on or in the substrate;
   RFIC side first and second terminal electrodes each connected to the RFIC;
   antenna side first and second terminal electrodes that are formed on or in the substrate and that are each directly connected or capacitively coupled to an antenna; and
   an impedance matching circuit formed on or in the substrate and connected to the RFIC side first and second terminal electrodes and the antenna side first and second terminal electrodes,
   wherein the impedance matching circuit includes a first inductor, a second inductor, a third inductor, a fourth inductor, and a fifth inductor,
   wherein the first inductor is connected between the antenna side first terminal electrode and the RFIC side first terminal electrode,
   wherein the second inductor is connected between the antenna side second terminal electrode and the RFIC side second terminal electrode,
   wherein the third inductor has a first end connected to the antenna side first terminal electrode,
   wherein the fourth inductor has a first end connected to the antenna side second terminal electrode,
   wherein the fifth inductor is connected between a second end of the third inductor and a second end of the fourth inductor,
   wherein the first, second, third and fourth inductors each comprise a conductor pattern of a coil shape wound along a surface of the substrate, and the fifth inductor comprises a conductor pattern of an unwound shape,
   wherein the first and third inductors are respectively formed in different layers of the substrate and are positioned to have coil openings that overlap each other,
   wherein the second and fourth inductors are respectively formed in different layers of the substrate and are positioned to have coil openings that overlap each other, and
   wherein the second inductor and the fourth inductor, and the first inductor and the third inductor are arranged in such a positional relationship as to interpose a mounting position of the RFIC along the surface of the substrate.

2. The RFIC module according to claim 1, wherein a winding direction from the RFIC side first terminal electrode to the second end of the third inductor is a same winding direction as from the RFIC side second terminal electrode to the second end of the fourth inductor.

3. The RFIC module according to claim 1, wherein each of the third, fourth and fifth inductors and the antenna side first and second terminal electrodes are formed by conductor patterns disposed in a same layer of the substrate.

4. The RFIC module according to claim 1, wherein the fifth inductor comprises a meander line shape, and a component of the fifth inductor in an arrangement direction of the first inductor and the second inductor are greater than a component of the fifth inductor in a direction orthogonal to the arrangement direction.

5. The RFIC module according to claim 1, wherein the substrate is a multilayer substrate having a cavity with the RFIC embedded therein.

6. The RFIC module according to claim 1, further comprising a chip capacitor mounted on the substrate.

7. The RFIC module according to claim 6, wherein the chip capacitor is connected between the RFIC side first terminal electrode and the RFIC side second terminal electrode.

8. The RFIC module according to claim 6, wherein the chip capacitor is connected between the antenna side first terminal electrode and the antenna side second terminal electrode.

9. An RFIC module comprising:
a substrate;
an RFIC mounted on or in the substrate;
RFIC side first and second terminal electrodes each connected to the RFIC;
antenna side first and second terminal electrodes that are formed on or in the substrate and that are each directly connected or capacitively coupled to an antenna; and
an impedance matching circuit formed on or in the substrate and connected to the RFIC side first and second terminal electrodes and the antenna side first and second terminal electrodes,
wherein the impedance matching circuit includes a first inductor, a second inductor, a third inductor, a fourth inductor, and a fifth inductor,
wherein the first, second, third and fourth inductors each comprise a conductor pattern of a coil shape wound along a surface of the substrate, and the fifth inductor comprises a conductor pattern of an unwound shape,
wherein the first and third inductors are respectively formed in different layers of the substrate and are positioned to have coil openings that overlap each other,
wherein the second and fourth inductors are respectively formed in different layers of the substrate and are positioned to have coil openings that overlap each other, and
wherein each of the third, fourth and fifth inductors and the antenna side first and second terminal electrodes are disposed in a same layer of the substrate.

10. The RFIC module according to claim 9, wherein the second inductor and the fourth inductor, and the first inductor and the third inductor are arranged in such a positional relationship as to interpose a mounting position of the RFIC along the surface of the substrate.

11. The RFIC module according to claim 9, wherein:
the first inductor is connected between the antenna side first terminal electrode and the RFIC side first terminal electrode,
the second inductor is connected between the antenna side second terminal electrode and the RFIC side second terminal electrode,
the third inductor has a first end connected to the antenna side first terminal electrode,
the fourth inductor has a first end connected to the antenna side second terminal electrode, and
the fifth inductor is connected between a second end of the third inductor and a second end of the fourth inductor.

12. The RFIC module according to claim 11, wherein a winding direction from the RFIC side first terminal electrode to the second end of the third inductor is a same winding direction as from the RFIC side second terminal electrode to the second end of the fourth inductor.

13. The RFIC module according to claim 11, wherein the fifth inductor comprises a meander line shape, and a component of the fifth inductor in an arrangement direction of the first inductor and the second inductor are greater than a component of the fifth inductor in a direction orthogonal to the arrangement direction.

14. The RFIC module according to claim 9, wherein the substrate is a multilayer substrate having a cavity with the RFIC embedded therein.

15. The RFIC module according to claim 9, further comprising a chip capacitor mounted on the substrate.

16. The RFIC module according to claim 15, wherein the chip capacitor is connected between the RFIC side first terminal electrode and the RFIC side second terminal electrode.

17. The RFIC module according to claim 15, wherein the chip capacitor is connected between the antenna side first terminal electrode and the antenna side second terminal electrode.

18. An RFID tag comprising:
an antenna; and
an RFIC module, including:
a substrate;
an RFIC mounted on or in the substrate;
RFIC side first and second terminal electrodes each connected to the RFIC;
antenna side first and second terminal electrodes that are formed on or in the substrate and that are each directly connected or capacitively coupled to the antenna; and
an impedance matching circuit formed on or in the substrate and connected to the RFIC side first and second terminal electrodes and the antenna side first and second terminal electrodes,
wherein the impedance matching circuit includes a first inductor, a second inductor, a third inductor, a fourth inductor, and a fifth inductor,
wherein the first inductor is connected between the antenna side first terminal electrode and the RFIC side first terminal electrode,
wherein the second inductor is connected between the antenna side second terminal electrode and the RFIC side second terminal electrode,
wherein the third inductor has a first end connected to the antenna side first terminal electrode,
wherein the fourth inductor has a first end connected to the antenna side second terminal electrode,
wherein the fifth inductor is connected between a second end of the third inductor and a second end of the fourth inductor,
wherein the first, second, third, and fourth inductors each comprise a conductor pattern of a coil shape wound along a surface of the substrate, and the fifth inductor comprises a conductor pattern of an unwound shape,
wherein the first and third inductors are respectively formed in different layers of the substrate and are positioned to have coil openings that overlap each other, wherein the second and fourth inductors are respectively formed in different layers of the substrate and are positioned to have coil openings that overlap each other, and wherein the second inductor and the fourth inductor, and the first inductor and the third inductor are arranged in such a positional relationship as to interpose a mounting position of the RFIC along the surface of the substrate.

19. The RFID tag according to claim 18, wherein:

the antenna includes two conductor patterns disposed on a flexible insulating film, the RFIC module is coupled to the insulating film, and the antenna side first and second terminal electrodes of the RFIC module face respective end portions of the two conductor patterns of the antenna.

20. The RFID tag according to claim 18, wherein each of the third, fourth and fifth inductors and the antenna side first and second terminal electrodes are formed by conductor patterns disposed in a same layer of the substrate.

* * * * *